(12) United States Patent
Chino et al.

(10) Patent No.: US 10,551,535 B2
(45) Date of Patent: Feb. 4, 2020

(54) IMAGE PICKUP APPARATUS CAPABLE OF INSERTING AND EXTRACTING FILTER

(71) Applicant: CANON KABUSHIKI KAISHA, Tokyo (JP)

(72) Inventors: Shunsuke Chino, Wako (JP); Minoru Haga, Kawasaki (JP); Seiya Ohta, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 442 days.

(21) Appl. No.: 15/177,633

(22) Filed: Jun. 9, 2016

(65) Prior Publication Data

US 2016/0366325 A1 Dec. 15, 2016

(30) Foreign Application Priority Data

Jun. 11, 2015 (JP) .................................. 2015-118348

(51) Int. Cl.
*H04N 5/235* (2006.01)
*G02B 5/20* (2006.01)
*H04N 5/232* (2006.01)

(52) U.S. Cl.
CPC ............. *G02B 5/208* (2013.01); *H04N 5/232* (2013.01); *G06T 2207/30168* (2013.01)

(58) Field of Classification Search
CPC .... H04N 5/2352; G02B 5/208; G06K 9/4604; G06K 9/4652
USPC ........................................................ 348/164
See application file for complete search history.

(56) References Cited

U.S. PATENT DOCUMENTS

| 6,449,013 | B1 * | 9/2002 | Suzuki | H04N 5/2254 348/272 |
| 7,196,855 | B2 * | 3/2007 | Yamaguchi | G02B 9/14 348/335 |
| 8,155,448 | B2 * | 4/2012 | Ida | G06T 7/13 382/199 |
| 8,587,878 | B2 * | 11/2013 | Ohashi | G02B 9/64 359/753 |

(Continued)

FOREIGN PATENT DOCUMENTS

| JP | 2009-025050 A | 2/2009 |
| JP | 2011-055176 A | 3/2011 |

(Continued)

OTHER PUBLICATIONS

The above foreign patent documents were cited in the Mar. 12, 2019 Japanese Office Action, without an English Translation, that issued in Japanese Patent Application No. 2015118348.

*Primary Examiner* — Nguyen T Truong
(74) *Attorney, Agent, or Firm* — Cowan, Liebowitz & Latman, P.C.

(57) ABSTRACT

An image pickup apparatus that is capable of preventing degradation of quality of an image obtained. An insertion-extraction unit inserts and extracts a filter of which transmittance for infrared light is higher than the transmittance for visible light. A computation unit computes an object distance between the image pickup apparatus and an object. An evaluation unit evaluates an image quality based on at least a sharpness in an image including a picked up object image. A control unit controls the insertion-extraction unit so as to insert or extract the filter based on at least one of the image quality and the object distance.

23 Claims, 17 Drawing Sheets

(56) References Cited

U.S. PATENT DOCUMENTS

| | | | | |
|---|---|---|---|---|
| 8,629,916 B2* | 1/2014 | Tanaka | ............ | G02B 7/34 |
| | | | | 348/222.1 |
| 8,659,672 B2* | 2/2014 | Hatakeyama | ......... | G06T 5/003 |
| | | | | 348/222.1 |
| 8,913,670 B2* | 12/2014 | Mak-Fan | ............ | H04N 19/176 |
| | | | | 375/240.29 |
| 8,928,783 B2* | 1/2015 | Yoshida | ............ | H04N 5/23219 |
| | | | | 348/222.1 |
| 9,392,170 B2* | 7/2016 | Yu | ............ | H04N 5/23245 |
| 2003/0142221 A1* | 7/2003 | Takakuwa | ............ | H04N 5/332 |
| | | | | 348/222.1 |
| 2015/0235070 A1* | 8/2015 | Wang | ............ | G06K 9/00006 |
| | | | | 382/115 |

FOREIGN PATENT DOCUMENTS

| JP | 2012-054904 A | 3/2012 |
|---|---|---|
| JP | 2012-090152 A | 5/2012 |
| JP | 2013-070304 A | 4/2013 |
| JP | 2015-058747 A | 3/2015 |

\* cited by examiner

— GAMMA CURVE
---- POST-CORRECTION GAMMA CURVE

FIG. 9

| INFRARED-PASS-FILTER INSERTED CORRECTION CONDITION | | | INFRARED-PASS-FILTER EXTRACTED CORRECTION CONDITION | | |
|---|---|---|---|---|---|
| GAMMA PROCESS | SHARPNESS PROCESS | NOISE REDUCTION PROCESS | GAMMA PROCESS | SHARPNESS PROCESS | NOISE REDUCTION PROCESS |
| 50 | 50 | 50 | 90 | 80 | 90 |

*FIG. 17*

|  |  | OBJECT DISTANCE | | |
|---|---|---|---|---|
|  |  | SHORT | MIDDLE | LONG |
| FOCAL LENGTH | SHORT | INFRARED PASS FILTER | INFRARED PASS FILTER | INFRARED PASS FILTER |
| | MIDDLE | INFRARED PASS FILTER | NARROW-BAND INFRARED PASS FILTER | NARROW-BAND INFRARED PASS FILTER |
| | LONG | INFRARED PASS FILTER | NARROW-BAND INFRARED PASS FILTER | ULTRANARROW-BAND INFRARED PASS FILTER |

IMAGE PICKUP APPARATUS CAPABLE OF INSERTING AND EXTRACTING FILTER

BACKGROUND OF THE INVENTION

Field of the Invention

The present invention relates to an image pickup apparatus that is capable of inserting and extracting a filter.

Description of the Related Art

It is known that an image of an object is blurred due to various factors when an image of an object is picked up with visible light. The various factors include degradation of brightness and rise of darkness (hereinafter referred to as a "contrast variation") in a video signal that is obtained when an image of an object is picked up, and fluctuation of an object. There is a known image pickup apparatus that takes the blur into consideration and inserts an infrared pass filter of which transmittance for infrared light is higher than transmittance for visible light when the contrast variation in a video signal is detected (for example, see Japanese Laid-Open Patent Publication (Kokai) No. 2012-54904 (JP 2012-54904A)).

Moreover, there is a known image pickup apparatus that inserts an infrared pass filter and picks up an image of an object when fluctuation of the object is detected on the basis of a motion vector of the object in a picked-up image (for example, see Japanese Laid-Open Patent Publication (Kokai) No. 2012-90152 (JP 2012-90152A)). These image pickup apparatuses form an object image by mainly using infrared light, which is hard to be affected by external factors and is highly rectilinear, by inserting an infrared pass filter in order to prevent blur of the object image.

However, an object image may be blurred even if neither a contrast variation nor a motion vector is detected from a video signal. For example, when fog exists between an image pickup apparatus and an object, a sharpness of an object image (difference in brightness at an edge of the object image) decreases because visible light is disturbed by the fog.

As a result, the object image is blurred and quality of the image obtained deteriorates. Moreover, since an influence of the fog that exists between an image pickup apparatus and an object becomes larger as the distance to the object becomes longer, the quality of the image becomes lower with the distance.

Furthermore, there is a case where insertion of an infrared pass filter is not preferable even when a contrast variation or a motion vector is detected. For example, when an image of an object is picked up under low illuminance while inserting an infrared pass filter, an obtained image becomes dark as a whole because the light amount used for forming an image decreases. Accordingly, a gain correction that increases a gain value of an image is applied to the image concerned in order to brighten the image that is dark as a whole. However, a high quality image cannot be obtained because a noise occurs in the image concerned according to the degree of the gain correction.

That is, there is a problem in that the quality of the image obtained deteriorates because the infrared pass filter is not inserted and extracted appropriately.

SUMMARY OF THE INVENTION

The present invention provides an image pickup apparatus that is capable of preventing degradation of quality of an image obtained.

Accordingly, a first aspect of the present invention provides an image pickup apparatus including an insertion-extraction unit configured to insert and extract a filter of which transmittance for infrared light is higher than the transmittance for visible light, a computation unit configured to compute an object distance between the image pickup apparatus and an object, an evaluation unit configured to evaluate an image quality based on at least a sharpness in an image including a picked up object image, and a control unit configured to control the insertion-extraction unit so as to insert or extract the filter based on at least one of the image quality and the object distance.

Accordingly, a second aspect of the present invention provides an image pickup apparatus including an insertion-extraction unit configured to insert and extract a filter of which transmittance for infrared light is higher than the transmittance for visible light, an obtaining unit configured to obtain a gain value set up when brightness of an image including a picked-up object image is adjusted, a gain value determination unit configured to determine whether the obtained gain value is equal to or more than a predetermined gain threshold, and a control unit configured to control the insertion-extraction unit so as to extract the filter when the obtained gain value is equal to or more than the predetermined threshold and to insert the filter when the obtained gain value is less than the predetermined threshold.

Accordingly, a third aspect of the present invention provides an image pickup apparatus including an insertion-extraction unit configured to insert or extract a first filter of which transmittance for infrared light is higher than the transmittance for visible light, a second filter of which a wavelength band of transmitting infrared light is narrower than that of the first filter, or a third filter of which a wavelength band of transmitting infrared light is narrower than that of the second filter, a computation unit configured to compute an object distance between the image pickup apparatus and an object, an obtaining unit configured to obtain a focal length of the image pickup apparatus, and a control unit configured to control the insertion-extraction unit so as to insert the first filter, the second filter, or the third filter according to the computed object distance and the obtained focal length.

According to the present invention, degradation of quality of an image obtained is prevented.

Further features of the present invention will become apparent from the following description of exemplary embodiments with reference to the attached drawings.

BRIEF DESCRIPTION OF THE DRAWINGS

FIG. 9 is a view showing an infrared-pass-filter inserted correction condition and an infrared-pass-filter extracted correction condition that are respectively set to the surveillance camera in the steps S803 and S805 in FIG. 8.

FIG. 17 is a view showing a relation between a type of filter inserted in the filter unit by performing the fourth insertion-extraction process in FIG. 16, an object distance, and a focal length.

DESCRIPTION OF THE EMBODIMENTS

Hereafter, embodiments according to the present invention will be described in detail with reference to the drawings.

Figure 1:
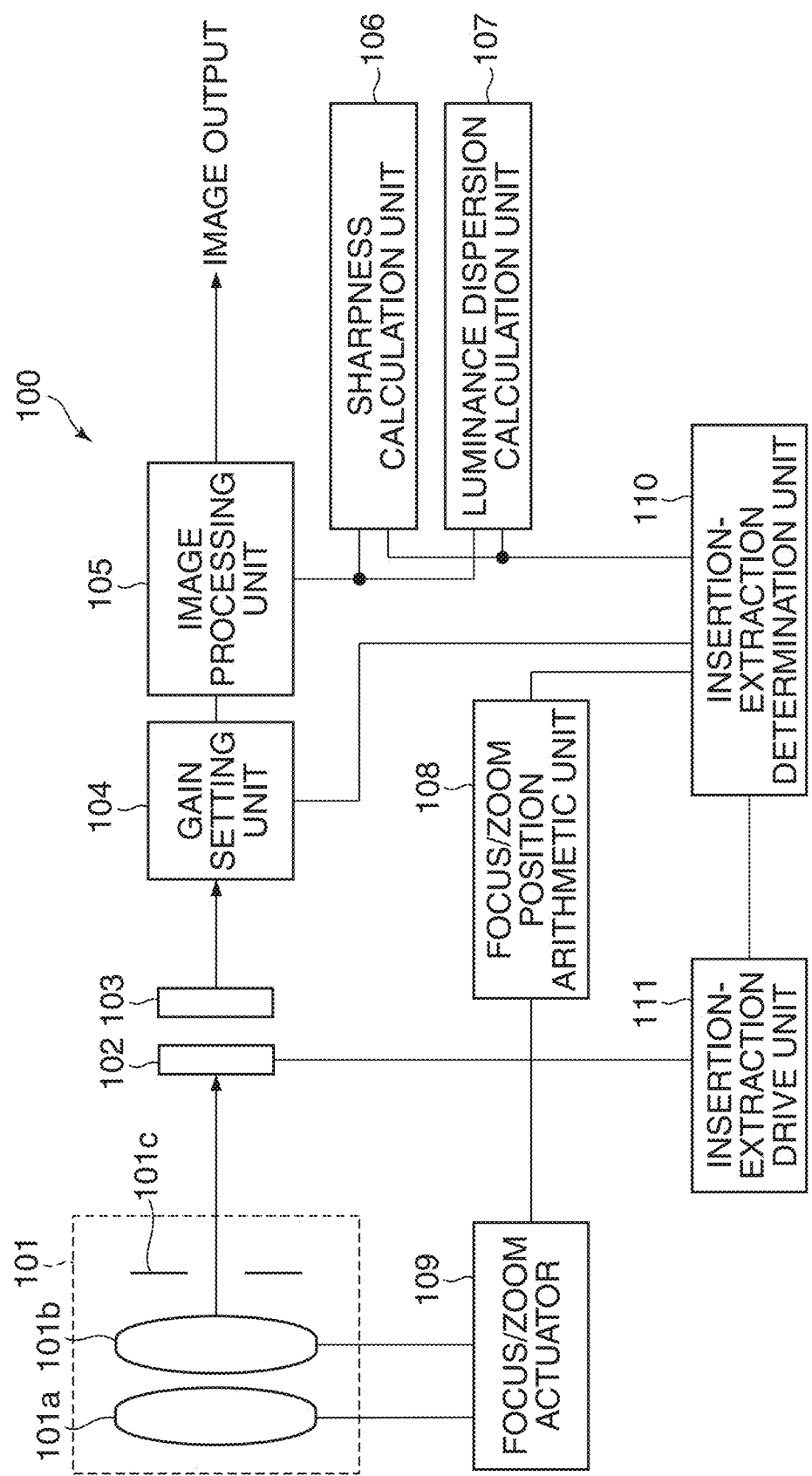
FIG. 1 is a block diagram schematically showing an internal configuration of a surveillance camera as an image pickup apparatus according to a first embodiment of the present invention.

FIG. 1 is a block diagram schematically showing an internal configuration of a surveillance camera 100 as an image pickup apparatus according to a first embodiment of the present invention.

The surveillance camera 100 in FIG. 1 is provided with a lens group 101, a filter unit 102, an image pickup device 103, a gain setting unit 104, an image processing unit 105, a sharpness calculation unit 106, and a luminance dispersion calculation unit 107. Moreover, the surveillance camera 100 is provided with a focus/zoom position arithmetic unit 108, focus/zoom actuator 109, and insertion-extraction determination unit 110 (a computation unit, determination unit, evaluation unit, control unit, gain value determination unit, execution unit), and insertion-extraction drive unit 111 (insertion-extraction unit).

Figure 2A:
FIG. 2A is a view showing an unclear image that was picked up under a state where an infrared pass filter was extracted from a filter unit in FIG. 1.
Figure 2B:
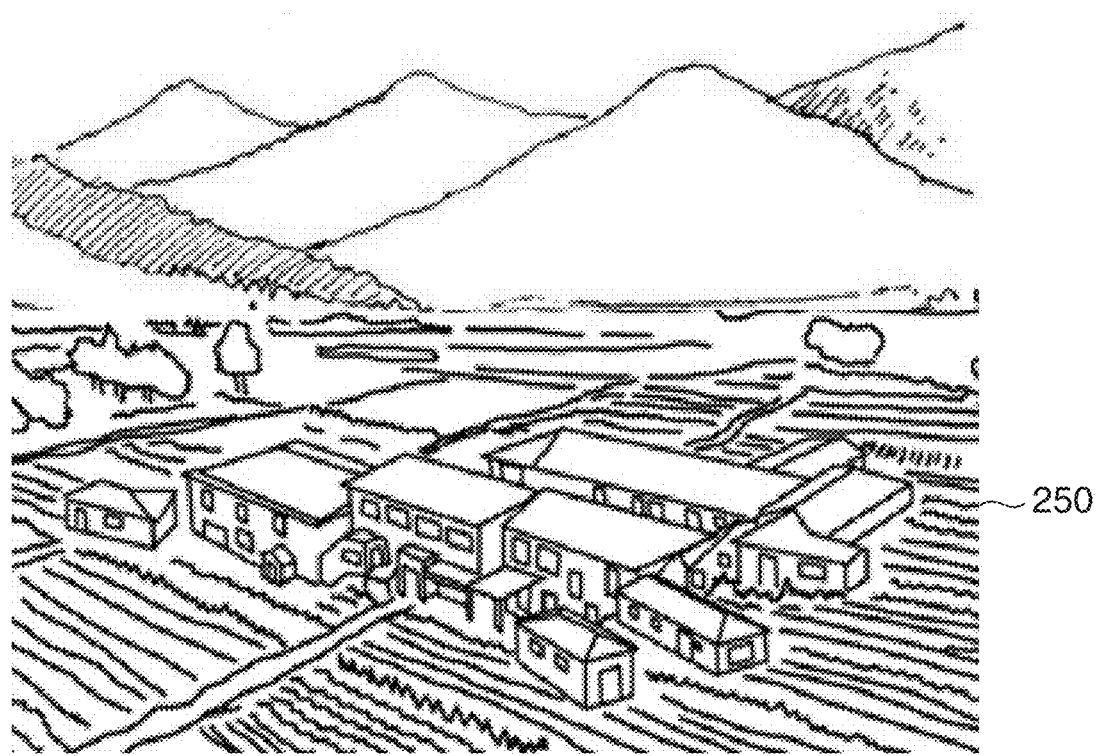
FIG. 2B is a view showing a clear image that was picked up under a state where the infrared pass filter was inserted into the filter unit in FIG. 1.

The lens group 101 is provided with a zoom lens 101a, focusing lens 101b, and diaphragm 101c. A filter, for example, an infrared pass filter, is inserted in the filter unit 102. When the infrared pass filter is inserted in the filter unit 102, infrared light, which is hard to be affected by external factors and is highly rectilinear, passes through the filter unit 102, and visible light is intercepted. For example, when an image of an object is picked up without inserting the infrared pass filter in the filter unit 102 in a state where fog exists between the surveillance camera 100 and the object, an unclear image 200 shown in FIG. 2A in which the object is not clearly recognized is obtained. On the other hand, when an image of an object is picked up with inserting the infrared pass filter in the filter unit 102 in a state where fog exists between the surveillance camera 100 and the object, a clear image 250 shown in FIG. 2B in which the object is clearly recognized is obtained.

An incident light flux into the surveillance camera 100 at the time of image pick-up enters into the image pickup device 103 via the lens group 101 and the filter unit 102. The image pickup device 103 is a CCD sensor or a CMOS sensor, for example, that converts the incident light flux into pixel signals and generates image data. The gain setting unit 104 sets up a suitable gain value G corresponding to the light flux entered into the image pickup device 103, and controls brightness. The gain setting unit 104 notifies the insertion-extraction determination unit 110 of the set-up gain value G. The image processing unit 105 applies various image processes, such as a color balance adjustment process for adjusting colors of pixels that constitutes the image data and the below-mentioned gamma process, to the generated image data, and outputs the image data to which the image processes have been applied.

When the surveillance camera 100 in the embodiment is provided with a communication unit (not shown) and is connected with an external apparatus like a PC through a network, the image data output from the image processing unit 105 may be transmitted to the external apparatus via the communication unit and the network. In this case, since it is enough that the surveillance camera 100 and an external apparatus are able to communicate, a network communication standard, communication scale, communication configuration, etc. are not limited. For example, a plurality of routers, switches, cables, etc. based on a communications standard, such as the Ethernet (registered trademark), are used for the network.

The sharpness calculation unit 106 calculates a sharpness F that shows whether an object is recognized clearly on the basis of the image data output from the image processing unit 105 (hereinafter referred to as a "visibility of an object"). The sharpness F is calculated on the basis of a luminance difference at an edge of an object in the image data, for example. When the luminance difference at the edge of the object is small, i.e., when the brightness difference between the object image and the background image is small, the sharpness F calculated becomes small. The sharpness calculation unit 106 notifies the insertion-extraction determination unit 110 of the calculated sharpness F.

The luminance difference at the edge of the object is computed on the basis of the luminance values of all the pixels that constitute the image data or the luminance values of some pixels sampled from all the pixels that constitute the image data.

Moreover, the sharpness F may be calculated on the basis of an integration value of the luminance values of all the pixels in predetermined areas or an integration value of the luminance values of some pixels sampled from all the pixels in the predetermined areas. Furthermore, the sharpness F may be calculated on the basis of an image obtained by applying a filtering process to the image data at a specific frequency. In this case, it is preferable to set the specific frequency so as to cut signals that are unnecessary in determination of the visibility of the object image.

Figure 3A:
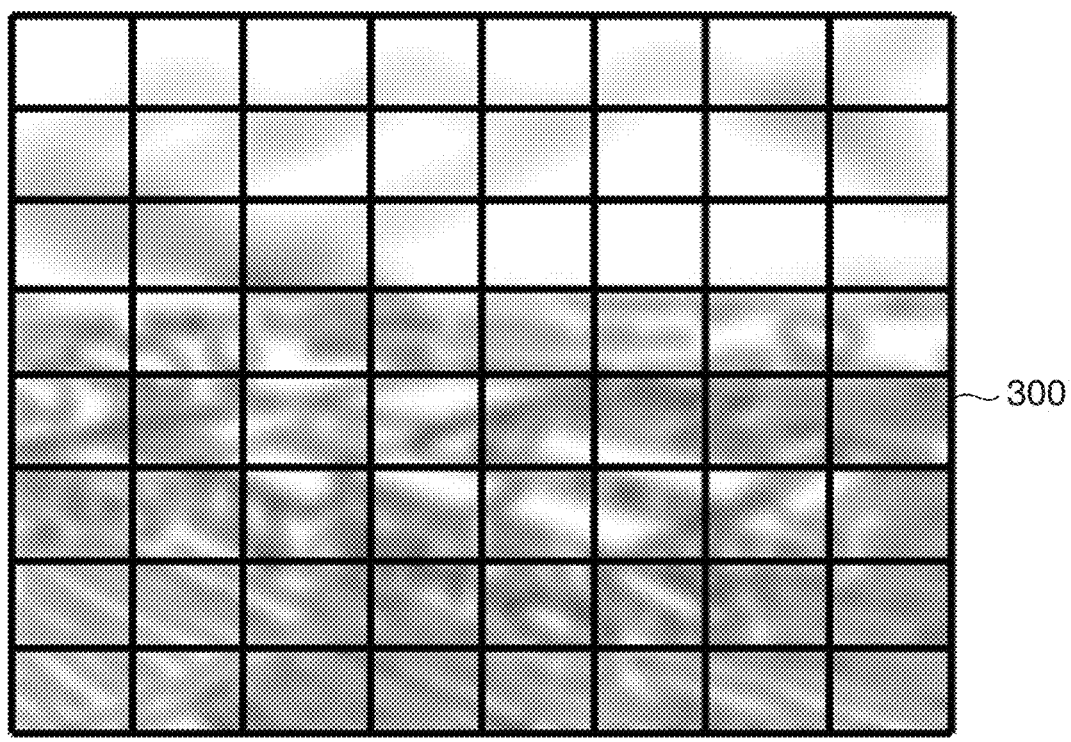
FIG. 3A is a view showing a post-division unclear image that is obtained by dividing the unclear image shown in FIG. 2A into a plurality of areas.
Figure 3B:
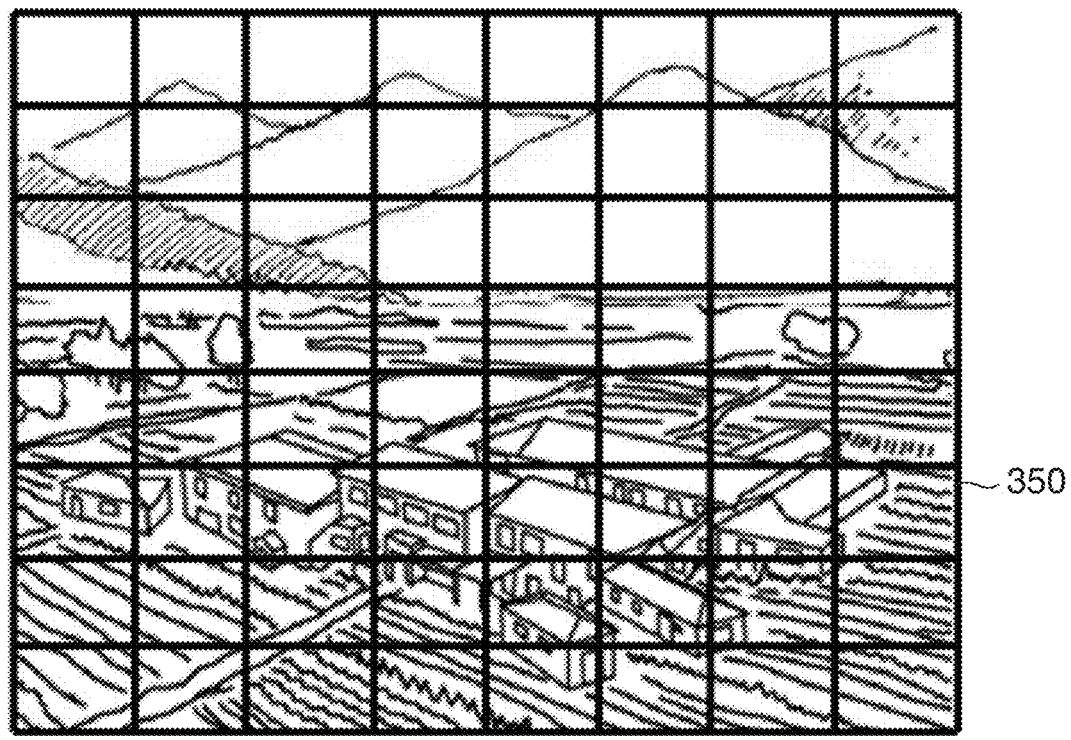
FIG. 3B is a view showing a post-division clear image that is obtained by dividing the unclear image shown in FIG. 2B into a plurality of areas.

Furthermore, the sharpness calculation unit 106 may divide the image data output from the image processing unit 105 into a plurality of areas and calculate the sharpness F for every divided area. For example, when the unclear image 200 and the clear image 250 are divided into 64 areas, respectively, a post-division unclear image 300 (FIG. 3A) and a post-division clear image 350 (FIG. 3B) are obtained. The sharpness calculation unit 106 may calculate the sharpness F for every area that constitutes the post-division unclear image 300 or the post-division clear image 350, count the number of areas of which the calculated sharpness F is equal to or more than a predetermined sharpness threshold $F_{th}$ (hereinafter referred to as the "clear area number $F_C$"), and notify the insertion-extraction determination unit 110 of the clear area number $F_C$ counted.

Figure 4A:
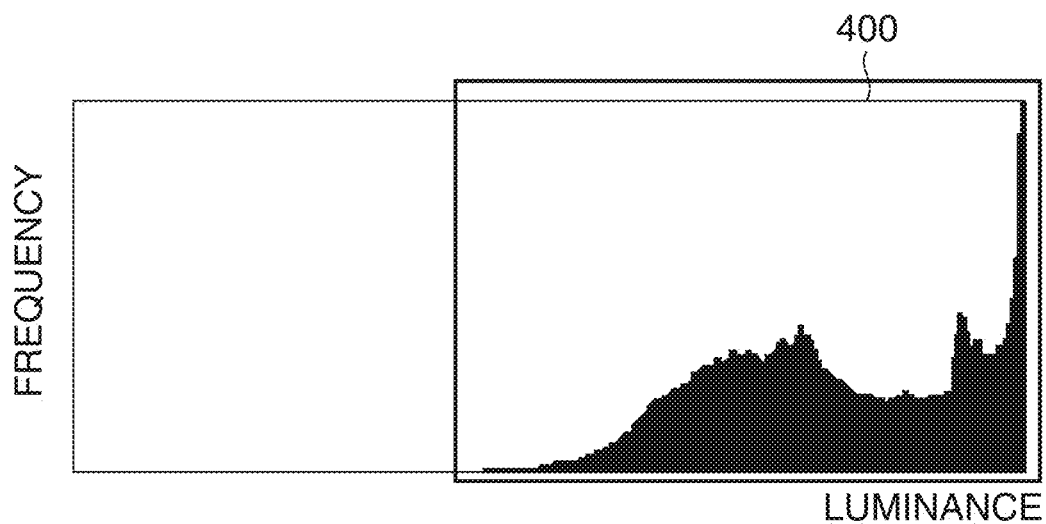
FIG. 4A is a view showing a luminance histogram corresponding to the unclear image shown in FIG. 2A.
Figure 4B:
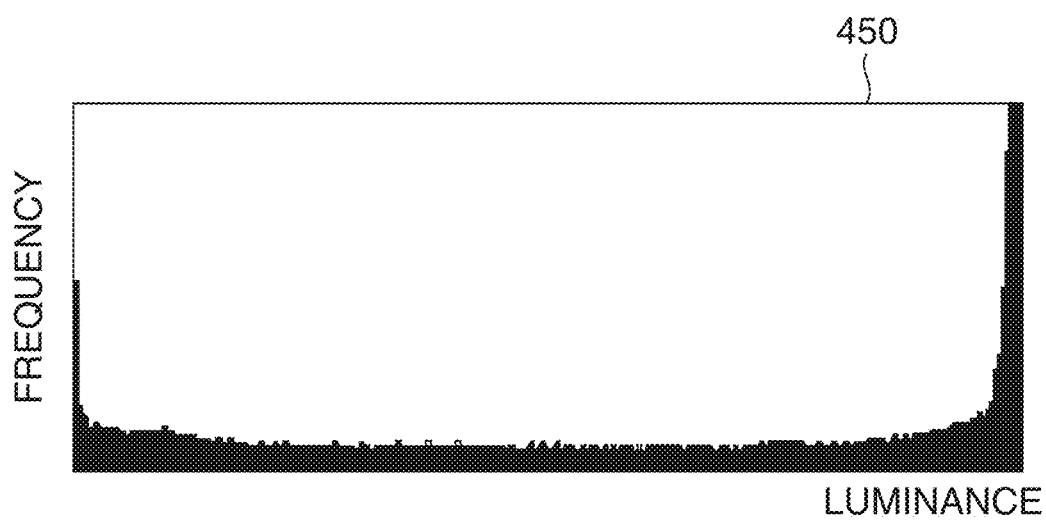
FIG. 4B is a view showing a luminance histogram corresponding to the clear image shown in FIG. 2B.

The luminance dispersion calculation unit 107 generates a luminance histogram (luminance distribution) on the basis of the image data output from the image processing unit 105, and calculates a luminance dispersion value $\Sigma$ from the generated luminance histogram. For example, the luminance dispersion calculation unit 107 generates a luminance histogram 400 (FIG. 4A) corresponding to the unclear image 200 and a luminance histogram 450 (FIG. 4B) corresponding to the clear image 250, and calculates the luminance dispersion value $\Sigma$ from the luminance histograms 400 and 450. In the other words, the luminance dispersion value $\Sigma$ is easily obtained on the basis of the generated luminance histograms 400 and 450. The luminance dispersion calculation unit 107 notifies the insertion-extraction determination unit 110 of the calculated luminance dispersion value $\Sigma$.

When the luminance histograms 400 and 450 are compared, although the luminance distribution of the luminance histogram 400 tends to deviate to a partial luminance range (to deviate to a range indicated by a frame in FIG. 4A), the luminance distribution of the luminance histogram 450 tends to be distributed to the entire luminance range. That is, the luminance dispersion value $\Sigma$ corresponding to the unclear image 200 tends to be smaller than the luminance dispersion value $\Sigma$ corresponding to the clear image 250.

The focus/zoom position arithmetic unit 108 notifies the focus/zoom actuator 109 of information about positions of the zoom lens 101a and the focusing lens 101b. The focus/zoom actuator 109 moves the zoom lens 101a and the focusing lens 101b on the basis of the information notified. Moreover, the focus/zoom position arithmetic unit 108 calculates a field angle determined on the basis of the positions of the zoom lens 101a and the focusing lens 101b, calculates an object distance from the surveillance camera 100 to an object, and notifies the insertion-extraction determination unit 110 of the field angle and the object distance that are calculated.

The insertion-extraction determination unit 110 determines whether an infrared pass filter should be inserted in the filter unit 102 on the basis of at least one of the gain value G, sharpness F, clear area number $F_C$, luminance dispersion value $\Sigma$, field angle, and object distance that are notified by the components. The insertion-extraction determination unit 110 determines that the image is unclear when the notified gain value G is less than a gain threshold $G_{th}$ preset in the surveillance camera 100 or when the sharpness F is less than a predetermined sharpness-threshold $F_{th}$ preset in the surveillance camera 100. Moreover, the insertion-extraction determination unit 110 determines that the image is unclear when the luminance dispersion value $\Sigma$ is less than a predetermined luminance distribution threshold $\Sigma_{th}$ preset in the surveillance camera 100. When determining that the image is unclear, the insertion-extraction determination unit 110 notifies the insertion-extraction drive unit 111 to insert the infrared pass filter in the filter unit 102.

The insertion-extraction determination unit 110 calculates an image quality E in consideration of the sharpness F and the luminance dispersion value $\Sigma$ that are notified according to the following equation, and determines whether the calculated image quality E is equal to or more than an image evaluation threshold $E_{th}$ preset in the surveillance camera 100. When the calculated image quality E is less than the image evaluation threshold $E_{th}$, the insertion-extraction determination unit 110 determines that the image is unclear, and notifies the insertion-extraction drive unit 111 to insert the infrared pass filter in the filter unit 102.

$$E = \alpha \cdot F + \beta \cdot \Sigma$$

Where $\alpha$ and $\beta$ are weighting coefficients ($\alpha \geq 0$, $\beta \geq 0$).

Furthermore, the insertion-extraction determination unit 110 may determine whether the notified clear area number FC is equal to or more than a clear area number threshold $F_{Cth}$ preset in the surveillance camera 100, for example. In this case, when the clear area number $F_C$ is less than the clear area number threshold $F_{Cth}$, the insertion-extraction determination unit 110 determines that the image is unclear, and notifies the insertion-extraction drive unit 111 to insert the infrared pass filter in the filter unit 102.

Even when determining to insert the infrared pass filter in the filter unit 102 as mentioned above, the insertion-extraction determination unit 110 may notify the insertion-extraction drive unit 111 to extract the infrared pass filter from the filter unit 102 according to a field angle or an object distance. For example, since there is a low possibility that an object to be picked up becomes indistinct according to fog when an object distance is 10 m or less, the insertion-extraction determination unit 110 notifies the insertion-extraction drive unit 111 to extract the infrared pass filter from the filter unit 102.

Moreover, the thresholds, such as the sharpness threshold $F_{th}$, may be changed according to conditions at the time of photographing. For example, when priority is given to securement of the light amount rather than the sharpness F of an object, the sharpness threshold $F_{th}$ is made smaller than a standard value. Accordingly, even when the sharpness is less than the standard value of the sharpness threshold $F_{th}$ and it would be determined that the infrared pass filter should be inserted in the filter unit 102, the filter is not inserted, which enables to pick up an image while keeping the light amount.

Furthermore, the thresholds may be changed according to the field angle or the object distance at the time of photographing the object. When the field angle is wide or when the object is far, an attention degree of a user to a long distance object is low, and the user does not care a blur at an edge of the object in many cases. On the other hand, when the field angle is telescopic or when the object is near, a user pays attention to the point of whether the edge of the object has blurred in many cases. That is, the user's attention degree to an edge of an object varies depending on the field angle or the object distance at the time of photographing an object. Corresponding to this, when the field angle is telescopic or when an object is near, the thresholds are set up large. Accordingly, when the user's attention degree to an edge of an object is high, the filter is inserted positively. This enables to prevent a user from being provided an image of which an edge of an object is blurred, and improves a user's satisfaction degree.

The insertion-extraction drive unit 111 inserts an infrared pass filter in the filter unit 102 or extracts the infrared pass filter from the filter unit 102 on the basis of the determination result notified from the insertion-extraction determination unit 110.

Figure 5:
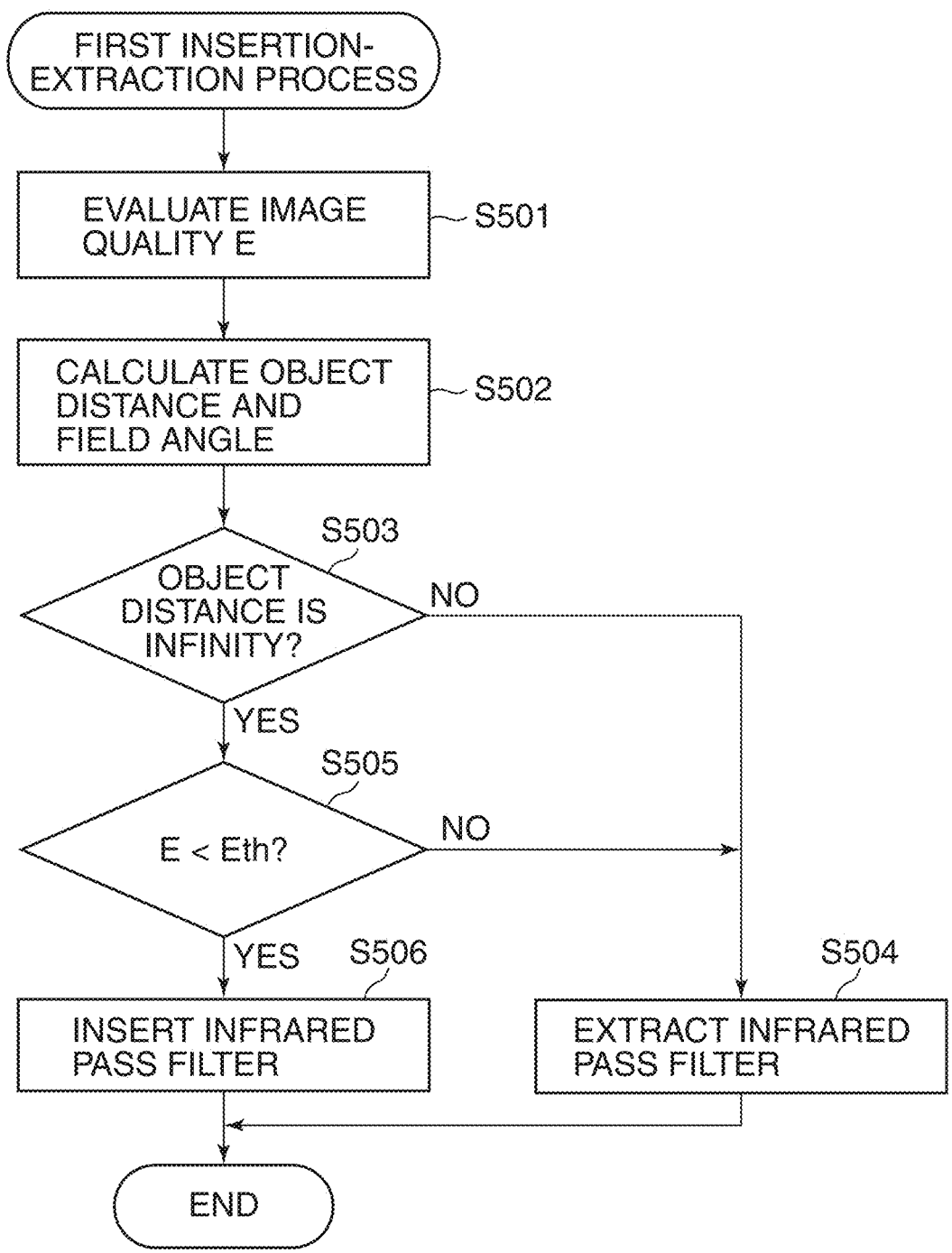
FIG. 5 is a flowchart showing procedures of a first insertion-extraction process executed by an insertion-extraction determination unit in FIG. 1.

FIG. 5 is a flowchart showing procedures of a first insertion-extraction process executed by the insertion-extraction determination unit 110 in FIG. 1. In the insertion-extraction process in FIG. 5, it is determined whether the infrared pass filter is inserted in the filter unit 102 on the basis of the object distance and the image quality E.

As shown in FIG. 5, the image quality E is calculated on the basis of the sharpness F and the luminance dispersion value Σ that were notified (step S501), and the object distance and the field angle are calculated on the basis of the positions of the zoom lens 101a and the focusing lens 101b (step S502). Next, it is determined whether the object distance is infinity (beyond a predetermined distance) (step S503). As a result of the determination in the step S503, when the object distance is not infinity (less than the predetermined distance), the insertion-extraction drive unit 111 is notified to extract the infrared pass filter from the filter unit 102 (step S504) because there is a low possibility that the object is blurred, and this process is finished. On the other hand, when the object distance is infinity, the insertion-extraction determination unit 110 determines whether the calculated image quality E is less than the image evaluation threshold $E_{th}$ preset in the surveillance camera 100 (step S505). As a result of the determination in the step S505, the image quality E is equal to or more than the image evaluation threshold $E_{th}$, the process proceeds to the step S504. On the other hand, when the image quality E is less than image evaluation threshold Eth, the insertion-extraction drive unit 111 is notified to insert the infrared pass filter in the filter unit 102 (step S506) because there is a high possibility that the object is blurred, and this process is finished.

In the process in FIG. 5, when the object distance is infinity (YES in the step S503) and the image quality E is less than the image evaluation threshold $E_{th}$ (YES in the step S504), there is a possibility that light other than infrared light in the light flux is disturbed by fog existed between the object and the surveillance camera 100, which reduces the brightness difference between the object image and the background image. In such a case, the infrared pass filter is inserted. As a result of this, light other than infrared light, which may be disturbed, is cut, an image of an object is mainly formed by the infrared light that is highly rectilinear, and the brightness difference between the object image and the background image is enlarged. This prevents deterioration of the quality of the image obtained. On the other hand, when the object distance is not infinity (NO in the step S503), the infrared pass filter is extracted. Moreover, even if the object distance is infinity (YES in the step S503), when the image quality E is equal to or more than the image evaluation threshold $E_{th}$ (NO in the step S504), the infrared pass filter is extracted.

In the process in FIG. 5, the luminance dispersion value Σ is taken into consideration in calculation of the image quality E (step S501). When the luminance dispersion value Σ is small, there is a possibility that the brightness difference between the object image and the background image is small because light other than infrared light is disturbed by fog between the surveillance camera 100 and the object. That is, when the luminance dispersion value Σ is small, the infrared pass filter tends to be inserted because the image quality E is calculated small. And when the infrared pass filter is inserted, light other than infrared light, which may be disturbed, is cut, which certainly prevents deterioration of quality of an image obtained.

Furthermore, according to the process in FIG. 5, it is determined whether the object distance is infinity (step S503). When the object distance is infinity and when fog exists between the object at infinity and the surveillance camera 100, light other than infrared light is disturbed, and the brightness difference between the object image and the background image becomes small. Since the infrared pass filter is inserted also in this case, light, which is other than infrared light and has high possibility of being disturbed, is cut certainly.

In the process in FIG. 5, it may be determined whether the object distance is infinity according to the field angle at the time of picking up an image of the object. Accuracy of determination about whether the object distance is infinity varies corresponding to the field angle at the time of picking up an image of the object. The accuracy concerned at a wide field angle is lower than the accuracy concerned at a telescopic field angle. Accordingly, the accuracy of determination about whether the object distance is infinity is improved by avoiding the determination about whether the object distance is infinity at a wide field angle and by determining whether the object distance is infinity at a telescopic field angle. As a result, the infrared pass filter is inserted or extracted on the basis of the exact information about the object distance.

Moreover, in the process in FIG. 5, the insertion-extraction determination unit 110 may determine whether the clear area number $F_C$, which is notified from the sharpness calculation unit 106 and is used instead of the image quality E, is less than the clear-area-number threshold $F_{Cth}$ that is beforehand set to the surveillance camera 100, when the object distance is infinity. In this case, when the clear area number $F_C$ is less than the clear-area-number threshold $F_{Cth}$, the infrared pass filter is inserted. When the clear area number $F_C$ is less than the clear-area-number threshold $F_{Cth}$, there is a possibility that fog exists between the object and the surveillance camera 100 and that the brightness difference between the object image and the background image is small because light other than infrared light is disturbed. Since the infrared pass filter is inserted in this case, the image of the object is mainly formed by the infrared light that is highly rectilinear. This prevents deterioration of the quality of the image. Furthermore, the clear area number $F_C$ is obtained when the image is divided into a plurality of areas and a plurality of sharpnesses F are calculated from the respective areas. That is, since it is determined whether the infrared pass filter is inserted or extracted using the plurality of sharpnesses F, it is reduced an incorrect determination about the insertion and extraction of the filter.

Furthermore, although it is determined whether the infrared pass filter would be inserted in the filter unit 102 on the basis of the object distance and the image quality E in the process in FIG. 5, it may be determined on the basis of at least one of the object distance and the image quality E. Accordingly, it is easily determined whether the infrared pass filter is inserted in the filter unit 102.

Next, a second embodiment of the present invention will be described with reference to the drawings. The configuration and action in the second embodiment of the present invention are fundamentally the same as that in the first embodiment mentioned above, and differs from the first embodiment in that an image process is applied to an image picked up according to insertion and extraction of the infrared pass filter. Hereinafter, the description about configuration and action that are overlapped with the first embodiment will be omitted, and different configuration and action will be described.

Figure 6:
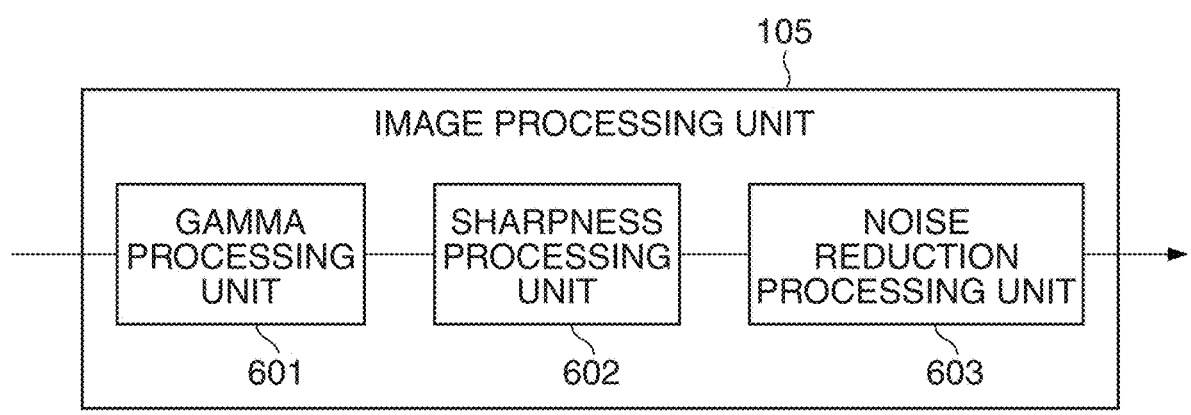
FIG. 6 is a block diagram schematically showing an internal configuration of an image processing unit of an surveillance camera as an image pickup apparatus according to a second embodiment of the present invention.

FIG. 6 is a block diagram schematically showing an internal configuration of an image processing unit 105 of an surveillance camera as an image pickup apparatus according to the second embodiment of the present invention.

The image processing unit 105 in FIG. 6 is provided with a gamma processing unit 601, a sharpness processing unit 602, and a noise reduction processing unit 603. The gamma processing unit 601 performs a gamma process that corrects a luminance level and a color difference level of an input image on the basis of a predetermined gamma curve and outputs the corrected luminance level.

Figure 7A:
FIG. 7A is a view showing a deteriorated image that is subjected to a process by the image processing unit shown in FIG. 6.
Figure 7B:
FIG. 7B is a view showing an improved image that is obtained by applying a gamma process to the deteriorated image shown in FIG. 7A with a gamma processing module in FIG. 6.
Figure 7C:
FIG. 7C is a view showing an object emphasis image that is obtained by applying a sharpness process to the improved image shown in FIG. 7B with a sharpness processing module in FIG. 6.
Figure 7D:
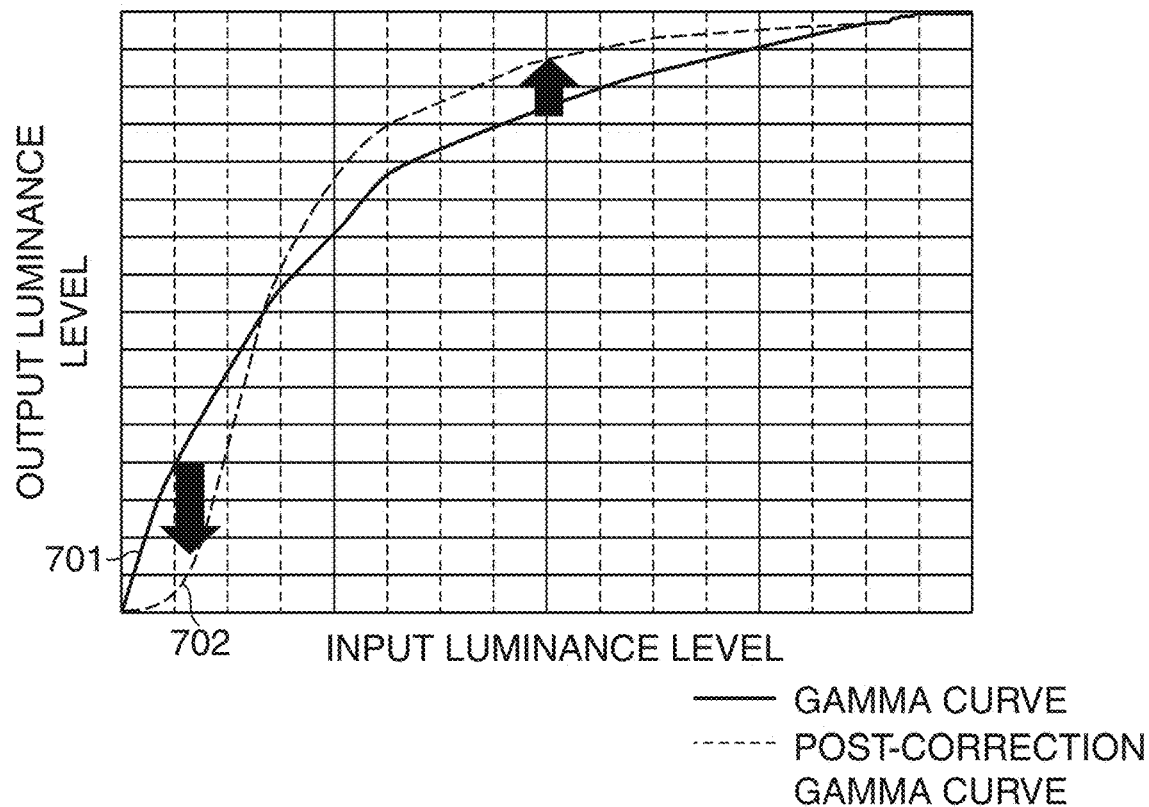
FIG. 7D is a graph showing gamma curves before and after applying the gamma process to the deteriorated image shown in FIG. 7A with the gamma processing module in FIG. 6.
Figure 7E:
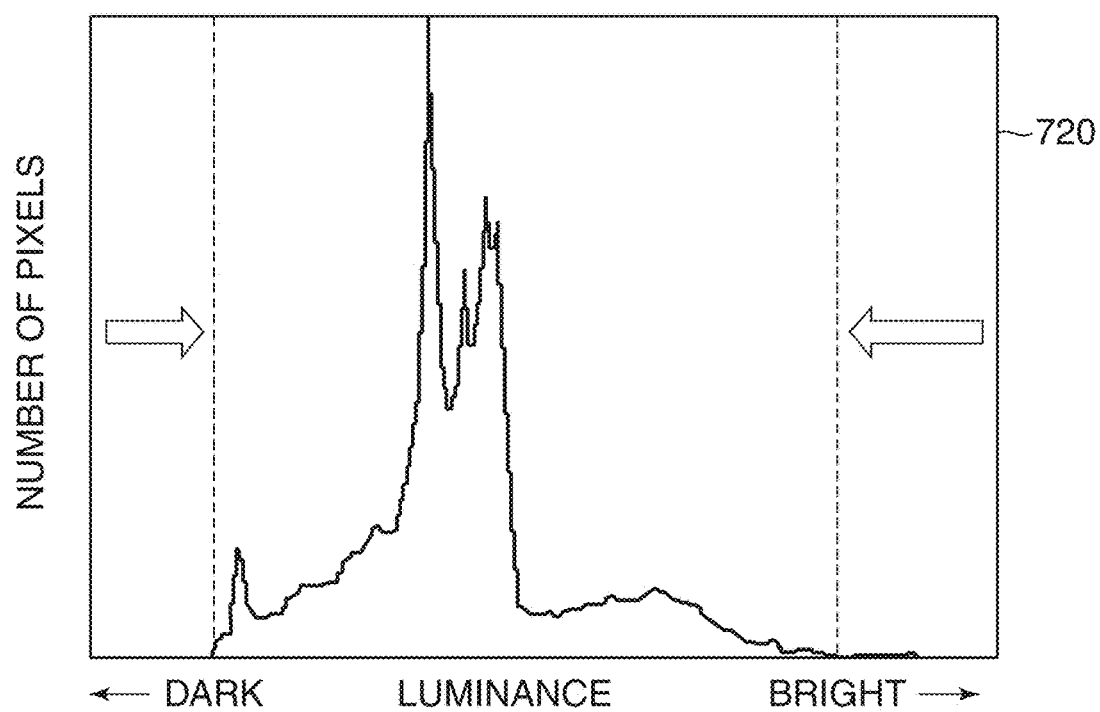
FIG. 7E is a view showing a luminance histogram generated on the basis of the deteriorated image shown in FIG. 7A.

For example, the gamma processing unit 601 generates a gamma curve 701 (a solid line in FIG. 7D) on the basis of the deteriorated image 700 (FIG. 7A), and generates a post-correction gamma curve 702 (a dotted line in FIG. 7D) by correcting the generated gamma curve 701. When the gamma curve 701 is corrected to the post-correction gamma curve 702, the luminance level and the color difference level of the deteriorated image 700 are corrected, and the improved image 710 (FIG. 7B) in which the brightness difference at the edge of the object in the deteriorated image 700 is emphasized is obtained. When the luminance dispersion calculation unit 107 generates a luminance histogram 720 (FIG. 7E) on the basis of the deteriorated image 700, the luminance distribution of the luminance histogram 720 tends to deviate to a partial luminance range as with the luminance histogram 400 corresponding to the unclear image 200.

The sharpness processing unit 602 performs a sharpness process that emphasizes the edge of the picked-up object. For example, the sharpness processing unit 602 applies the sharpness process that emphasizes a high frequency component to the improved image 710. As a result, an object emphasis image 730 (FIG. 7C) that enables to easily recognize the information about the object in the improved image 710, such as characters written on the object in the improved image 710, is obtained.

The noise reduction processing unit 603 performs a noise reduction process that reduces noise included in the picked-up image. For example, the noise reduction processing unit 603 reduces the noise that occurs when the improved image 710 or the object emphasis image 730 is obtained.

Figure 8:
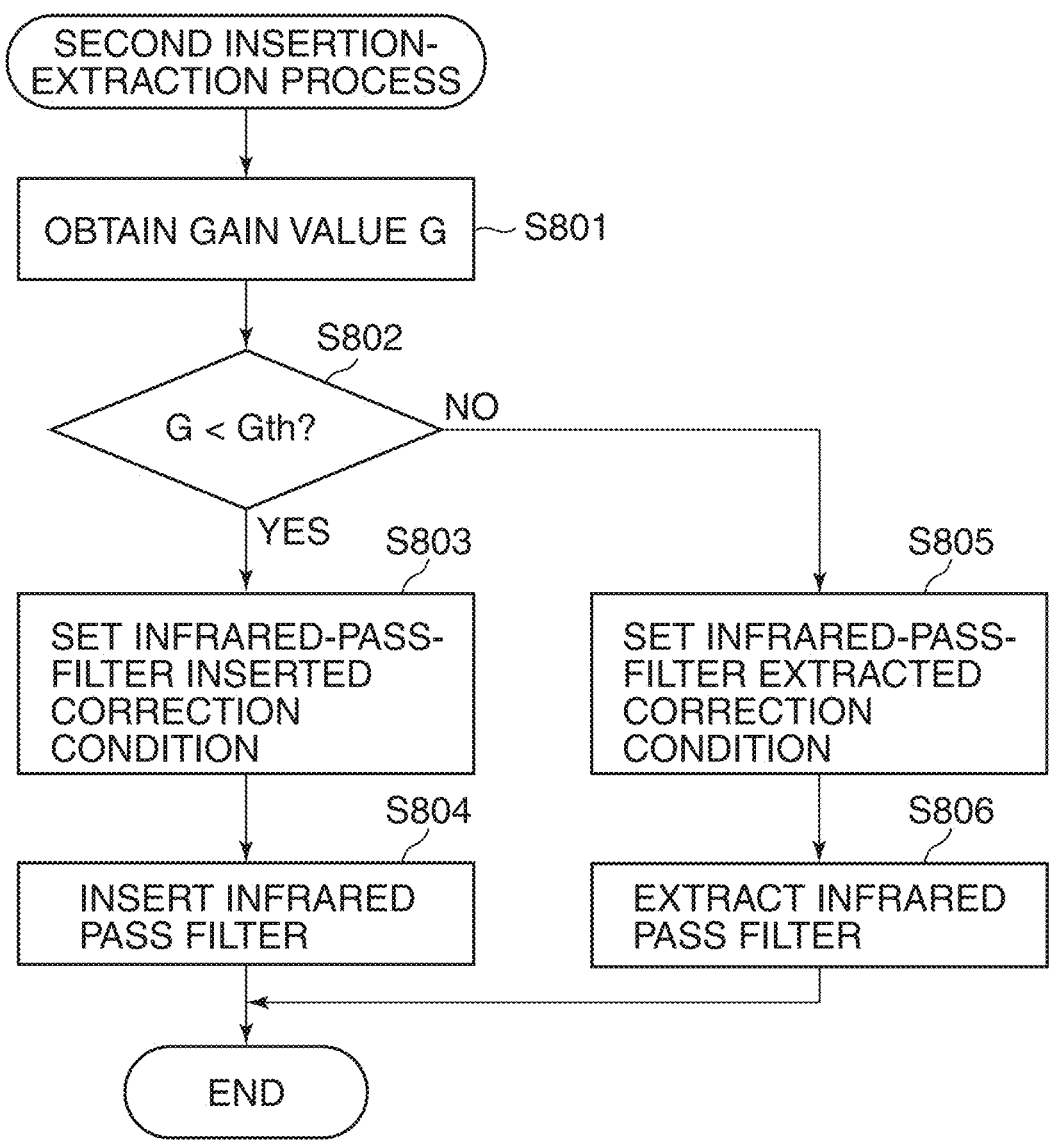
FIG. 8 is a flowchart showing procedures of a second insertion-extraction process executed by an insertion-extraction determination unit according to the second embodiment.

FIG. 8 is a flowchart showing procedures of a second insertion-extraction process executed by an insertion-extraction determination unit 110 according to the second embodiment. In the insertion-extraction process in FIG. 8, it is determined whether the infrared pass filter is inserted in the filter unit 102 on the basis of the gain value G.

As shown in FIG. 8, the gain value G is obtained from the gain setting unit 104 (step S801), and it is determined whether the obtained gain value G is less than the gain threshold $G_{th}$ (step S802).

As a result of the determination in the step S802, when the obtained gain value G is less than the gain threshold $G_{th}$, an infrared-pass-filter inserted correction condition (a correction condition when the infrared pass filter is inserted) mentioned below is set to the surveillance camera 100 (step S803). After that, the infrared pass filter is inserted in the filter unit 102 (step S804), and this process is finished. On the other hand, when the obtained gain value G is equal to or more than the gain threshold $G_{th}$, an infrared-pass-filter extracted correction condition (a correction condition when the infrared pass filter is extracted) mentioned below is set to the surveillance camera 100 (step S805). After that, the infrared pass filter is extracted from the filter unit 102 (step S806), and this process is finished.

FIG. 9 is a view showing an infrared-pass-filter inserted correction condition and an infrared-pass-filter extracted correction condition that are respectively set to the surveillance camera 100 in the steps S803 and S805 in FIG. 8.

FIG. 9 shows processing levels of processes executed by the gamma processing unit 601, the sharpness processing unit 602, and the noise reduction processing unit 603 when the infrared pass filter is inserted and when the infrared pass filter is extracted. Each of the processing levels is indicated by a numerical value of 0 through 100, and a higher numerical value shows that a stronger level process will be applied. The processing level of the infrared-pass-filter extracted correction condition is higher than the processing level of the infrared-pass-filter inserted correction condition. That is, when the infrared pass filter is inserted and an image with the high sharpness F is obtained, a level of image process applied to the image concerned is weak. On the other hand, when the infrared pass filter is extracted and an image with the low sharpness F is obtained, a level of image process applied to the image concerned is strong, and the sharpness F of the image improves as a result.

According to the process in FIG. 8, when the obtained gain value G is less than the gain threshold $G_{th}$ (YES in the step S802), the infrared pass filter is inserted in the filter unit 102 (step S804). Moreover, when the obtained gain value G is equal to or more than the gain threshold $G_{th}$, the infrared pass filter is extracted from the filter unit 102 (step S806). When the obtained gain value G is less than the gain threshold $G_{th}$, a sufficient light amount is ensured and an image of an object is picked up, and the gain setting unit 104 is not needed to set the gain value that is equal to or more than the gain threshold $G_{th}$ to the image in order to adjust the brightness. Accordingly, the image does not become dark as a whole even if the infrared pass filter is inserted in order to improve the sharpness F of the image and a part of light flux is cut. On the other hand, when the obtained gain value G is equal to or more than the gain threshold $G_{th}$, a sufficient light amount is not ensured and an image of an object is picked up, and the gain setting unit 104 is needed to set the high gain value because the obtained image is dark as a whole. However, the image after the gain correction may include noise in this case. Corresponding to this, since the infrared pass filter is extracted when the obtained gain value G is equal to or more than the gain threshold $G_{th}$ in the process in FIG. 8, the light amount increases and the gain correction applied to an image becomes unnecessary, which avoids noise in the image as a result. That is, the deterioration of quality of the image obtained is prevented by inserting or extracting the infrared pass filter according to the obtained gain value G.

According to the process in FIG. 8, when the obtained gain value G is less than the gain threshold $G_{th}$ (YES in the step S802), the infrared-pass-filter inserted correction condition is set to the surveillance camera 100 (step S803). On the other hand, when the obtained gain value G is equal to or more than the gain threshold $G_{th}$ (NO in the step S802), the infrared-pass-filter extracted correction condition is set to the surveillance camera 100 (step S805). The processing level of the infrared-pass-filter extracted correction condition is higher than the processing level of the infrared-pass-filter inserted correction condition (FIG. 9). That is, when the infrared pass filter is inserted and the image with the high sharpness F is obtained, the level of image process applied to the image concerned is low. When the infrared pass filter is extracted and the image with the low sharpness F is obtained, the level of image process applied to the image concerned is high. Accordingly, the sharpnesses F of both of the image obtained when the infrared pass filter is inserted and the image obtained when the infrared pass filter is extracted become high. As a result, since the change of the sharpness F that occurs in the image according to the insertion and extraction of the infrared pass filter is avoided, the image that keeps a predetermined quality is obtained regardless of the range of light used at the time of photographing.

According to the process in FIG. 8, the gamma process, the sharpness process, or the noise reduction process is applied as an image process to both of the image obtained when the infrared pass filter is inserted and the image obtained when the infrared pass filter is extracted. Accordingly the edge of the object included in the image is emphasized, and the sharpness F is raised.

Figure 10:
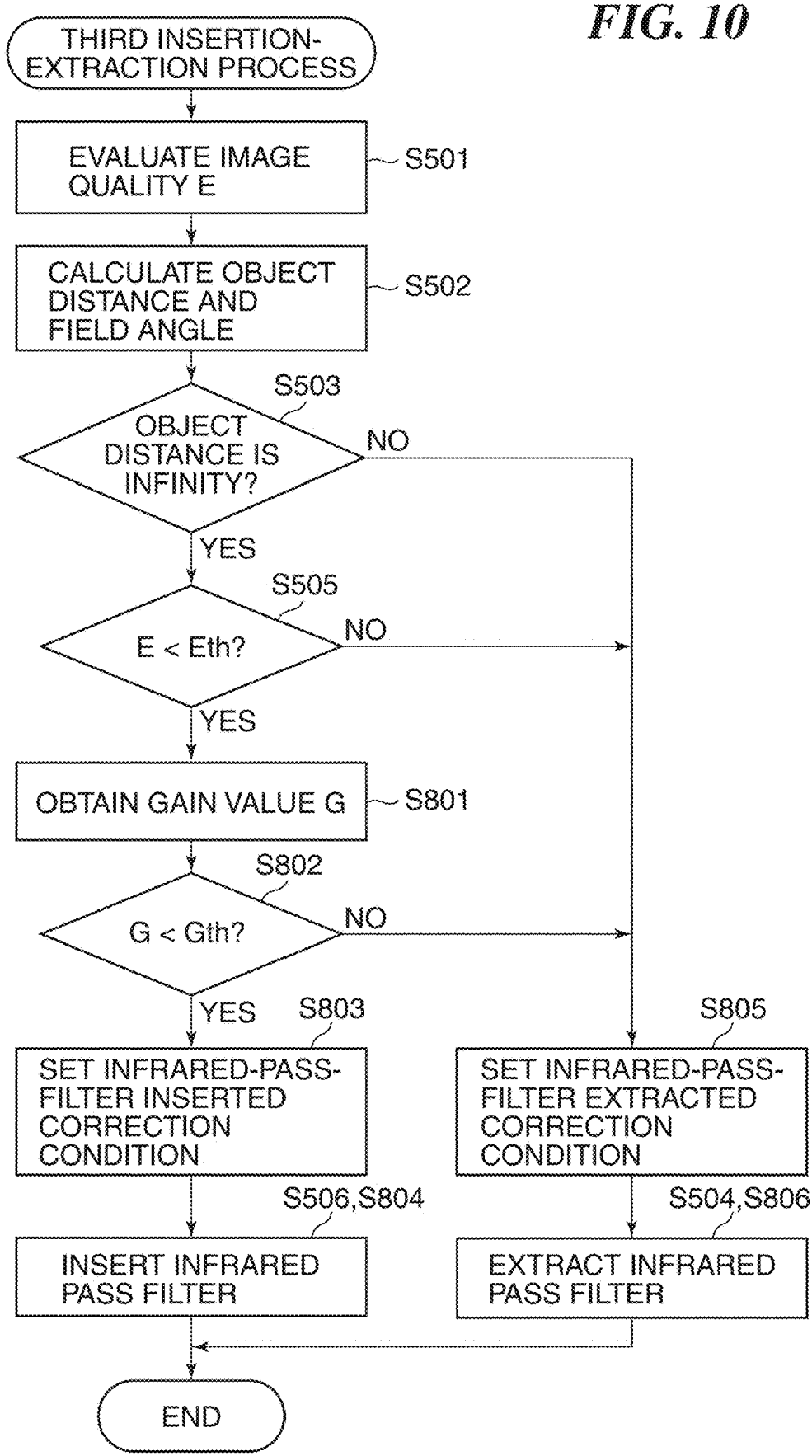
FIG. 10 is a flowchart showing procedures of a third insertion-extraction process executed by the insertion-extraction determination unit according to the second embodiment.

It should be noted that the insertion-extraction determination unit 110 may perform a third insertion-extraction process in which the second insertion-extraction process is performed after the insertion-and-extraction determination in the above-mentioned first insertion-extraction process (FIG. 10). Steps S501 through S506 in FIG. 10 are the same as the steps S501 through S506 in FIG. 5, and steps S801 through S806 in FIG. 10 are the same as the steps S801 through S806 in FIG. 8.

In the third insertion-extraction process, even when the object distance is infinity (YES in the step S503) and the image quality E is less than the image evaluation threshold $E_{th}$ (YES in the step S505), the infrared pass filter is not inserted promptly, and it is determined whether the gain value G obtained is equal to or more than the gain threshold $G_{th}$ (step S802). When the obtained gain value G is equal to or more than the gain threshold $G_{th}$, the infrared pass filter is extracted (steps S504 and S806). Accordingly, the light amount increases and the gain correction applied to an image becomes unnecessary, which avoids noise in the image. That is, the priority is given to the avoidance of the noise in the image by extracting the infrared pass filter rather than the enlargement of the brightness difference between the object image and the background image in the third insertion-extraction process.

Next, a third embodiment of the present invention will be described with reference to the drawings. The configuration and action in the third embodiment of the present invention are fundamentally the same as that in the first embodiment mentioned above, and differs from the first embodiment in that an infrared pass filter that is selected from among a plurality of filters according to an object distance and a focal length of a surveillance camera is inserted and extracted. Hereinafter, the description about configuration and action that are overlapped with the first embodiment will be omitted, and different configuration and action will be described.

Figure 11:
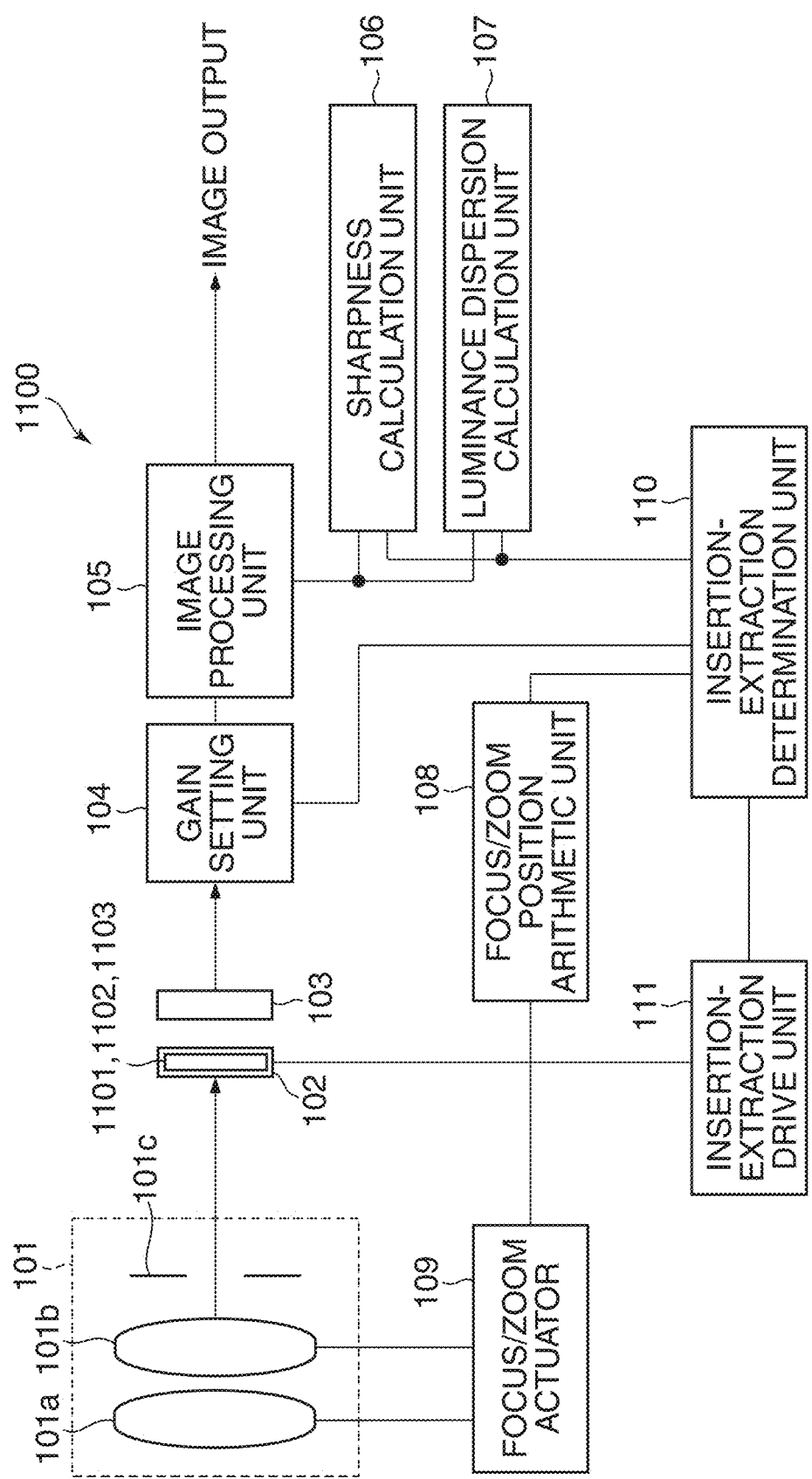
FIG. 11 is a block diagram schematically showing an internal configuration of a surveillance camera as an image pickup apparatus according to a third embodiment of the present invention.

FIG. 11 is a block diagram schematically showing an internal configuration of a surveillance camera 1100 as an image pickup apparatus according to the third embodiment of the present invention.

The configuration of the surveillance camera 1100 in FIG. 11 is fundamentally the same as the configuration of the surveillance camera 100 in FIG. 1. An infrared pass filter 1101 (first filter), a narrow-band infrared pass filter 1102 (second filter), and an ultranarrow-band infrared pass filter 1103 (third filter) are selectably inserted in or extracted from a filter unit 102 of the surveillance camera 1100. The infrared pass filter 1101 is a filter of which transmittance for infrared light is higher than transmittance for visible light. The narrow-band infrared pass filter 1102 is a filter of which the transmitting wavelength range for the infrared light is narrower than that of the infrared pass filter 1101. Moreover, the ultranarrow-band infrared pass filter 1103 is a filter of which the transmitting wavelength range for the infrared light is narrower than that of the narrow-band infrared pass filter 1102.

Figure 12:
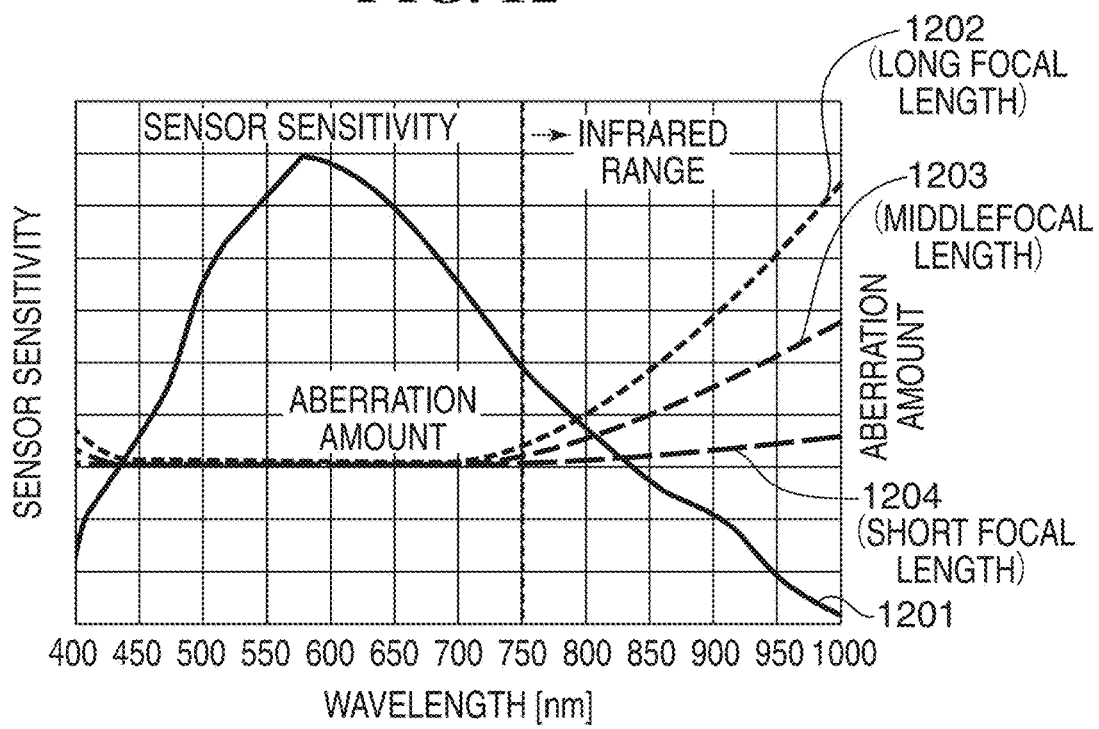
FIG. 12 is a graph showing a sensor sensitivity of an image pickup device in case where no filter is inserted in a filter unit in FIG. 11, and a relation between a wavelength of a light flux received by the image pickup device, a focal length of the surveillance camera, and an aberration amount of an image formed on the image pickup device.

FIG. 12 is a graph showing a sensor sensitivity of an image pickup device 103 in a case where no filter is inserted in the filter unit 102 in FIG. 11, and a relation between a wavelength of a light flux received by the image pickup device 103, a focal length of the surveillance camera 1100, and an aberration amount of an image formed on the image pickup device 103. It should be noted that the aberration amount of an image formed on the image pickup device 103 (hereinafter referred to as an "aberration amount" simply) means blur and distortion occurred in the image formed on the image pickup device 103 when the object is photographed.

As shown in FIG. 12, when the wave length range of the light flux received by the image pickup device 103 is 550 through 600 nm, the sensor sensitivity of the image pickup device 103 is the highest. Moreover, when the image pickup device 103 receives the light flux of which the wavelength is more than 600 nm, the sensor sensitivity of the image pickup device 103 drops as the wavelength of the light flux increases (a curve 1201 in FIG. 12). Furthermore, the aberration amounts become larger as the wavelength of the light flux received by the image pickup device 103 becomes longer (curves 1202, 1203, and 1204 in FIG. 12). Moreover, the aberration amounts become larger as the focal length of the surveillance camera 1100 becomes longer (the curves 1202, 1203, and 1204 in FIG. 12).

Figure 13:
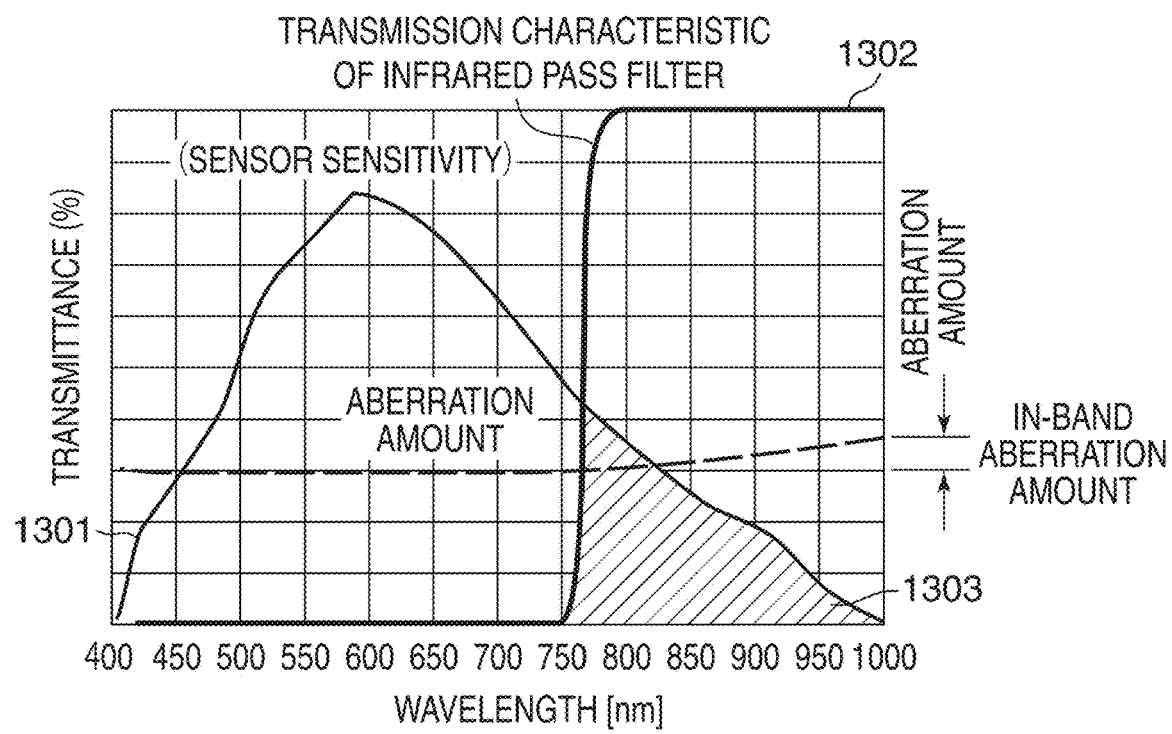
FIG. 13 is a graph showing a relation between a transmission characteristic of an infrared pass filter, a light amount taken by the image pickup device, and an aberration amount occurred in a case where the infrared pass filter is inserted in the filter unit in FIG. 11 and where the focal length of the surveillance camera is short.

FIG. 13 is a graph showing a relation between a transmission characteristic of the infrared pass filter 1101, the light amount captured by the image pickup device 103, and the aberration amount occurred in a case where the infrared pass filter 1101 is inserted in the filter unit 102 in FIG. 11 and where the focal length of the surveillance camera 100 is short.

As shown in FIG. 13, the infrared pass filter 1101 intercepts the light component (visible light) of which the wavelength range is less than 750 nm among the light flux that would be received by the image pickup device 103, and permits transmission of the light component (infrared light) of which the wavelength range is more than 750 nm. Moreover, an area of a region 1303 (a shadow region in FIG. 13) surrounded by the sensitivity curve 1301 and the transmission curve 1302 indicates the light amount taken by the image pickup device 103. The increase of the area means the increase of the light amount taken by the image pickup device 103.

Since the focal length of the surveillance camera 100 is short in the case shown in FIG. 13, the occurred aberration amount (hereinafter referred to as an "in-band aberration amount") is small and is kept within a tolerance even if the image is obtained using the infrared light in the entire wavelength range that transmits the infrared pass filter 1101. Accordingly, when the focal length of the surveillance camera 100 is short, it is controlled so as to use the infrared pass filter 1101 in this embodiment.

Figure 14A:
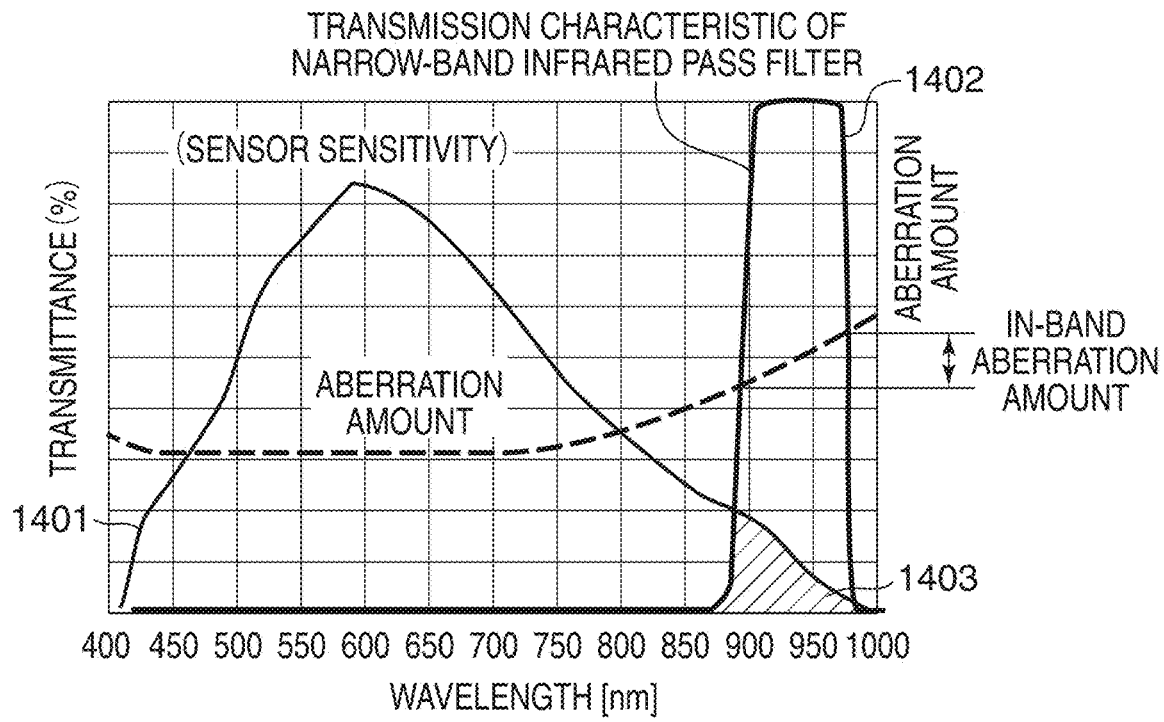
FIG. 14A is a graph showing a relation between a transmission characteristic of a first narrow-band infrared pass filter, a light amount taken by the image pickup device, and an aberration amount occurred in cases where the first narrow-band infrared pass filter is inserted in the filter unit in FIG. 11 and where the focal length of the surveillance camera is middle.
Figure 14B:
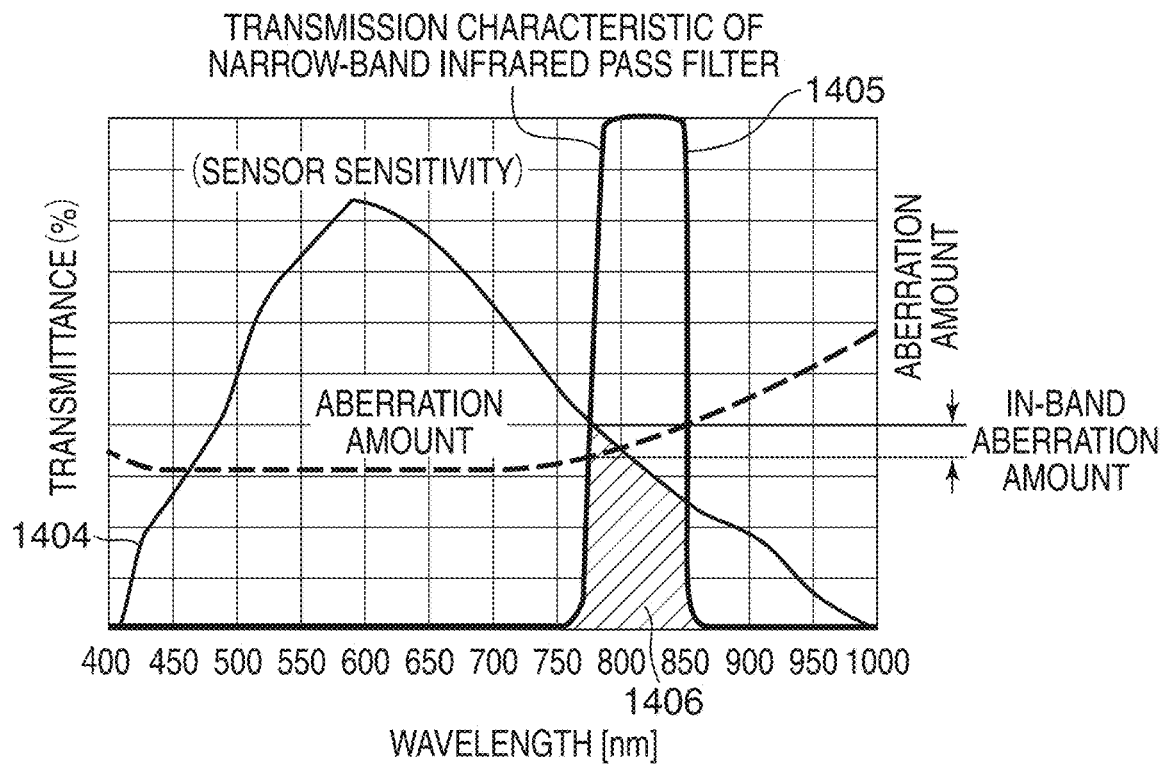
FIG. 14B is a graph showing the same relation as FIG. 14A using a second narrow-band infrared pass filter of which a transmission band is different from that of the first narrow-band infrared pass filter.

FIG. 14A is a graph showing a relation between a transmission characteristic of a first narrow-band infrared pass filter 1102, a light amount taken by the image pickup device 103, and an aberration amount occurred in cases where the first narrow-band infrared pass filter 1102 is inserted in the filter unit 102 in FIG. 11 and where the focal length of the surveillance camera 100 is middle. FIG. 14B is a graph showing the same relation as FIG. 14A using a second narrow-band infrared pass filter 1102 of which a transmission band is different from that of the first narrow-band infrared pass filter. It should be noted that the middle focal length is shorter than a long focal length and is longer than the short focal length. Since the aberration amount in the middle focal length at the side of long wavelength becomes larger than that in the short focal length, the in-band aberration amount would not be kept within the tolerance if the infrared pass filter 1101 that does not cut the long wavelength side is used.

Accordingly, it is preferable to use the narrow-band infrared pass filter 1102 that permits transmission of the light flux in a predetermined wavelength band in the infrared range in the middle focal length. The in-band aberration amount at the time of using the narrow-band infrared pass filter 1102 is found based on a difference between the aberration amounts at the upper limit and the lower limit of the wavelength band. The upper limit wavelength and the lower limit wavelength are determined so that this in-band aberration amount may be kept in the tolerance. For example, the narrow-band infrared pass filter 1102 of which transmission characteristics is indicated by a transmission curve 1402 shown in FIG. 14A permits transmission of the light flux in a wavelength band from 900 nm to 1000 nm in the infrared range. The narrow-band infrared pass filter 1102 of which transmission characteristics is indicated by a transmission curve 1405 shown in FIG. 14B permits transmission of the light flux in a wavelength band from 750 nm to 850 nm in the infrared range.

An area of a region 1406 (a shadow region in FIG. 14B) surrounded by the sensitivity curve 1404 and the transmission curve 1405 in FIG. 14B is larger than an area of a region 1403 (a shadow region in FIG. 14A) surrounded by the sensitivity curve 1401 and the transmission curve 1402 in FIG. 14A. Accordingly, the image obtained by the transmitted light flux of the wavelength band from 750 nm to 850 nm is brighter than the image obtained by the transmitted light flux of the wavelength band from 900 nm to 1000 nm.

Since the sharpness of an object drops as the wavelength becomes shorter, the sharpness of the object in the image obtained by the transmitted light flux of the wavelength band from 750 nm to 850 nm is lower than the sharpness of the object in the image obtained by the transmitted light flux of the wavelength band from 900 nm to 1000 nm. However, since light within the visible light range is hardly transmitted in both the cases, the difference between the sharpnesses is small, and the difference does not affect the quality of the image so much.

On the other hand, the in-band aberration amount of the image obtained by the transmitted light flux of the wavelength band from 750 nm to 850 nm is smaller than the in-band aberration amount of the image obtained by the transmitted light flux of the wavelength band from 900 nm to 1000 nm. Accordingly, the image obtained by the transmitted light flux of the wavelength band from 750 nm to 850 nm is less in the deterioration of the quality according to the aberration. Accordingly, when the focal length of the surveillance camera 100 is middle, it is preferable to use the narrow-band infrared pass filter 1102 that permits transmission of the light flux of the wavelength band from 750 nm to 850 nm by comprehensively considering the brightness of the image, the sharpness, and the in-band aberration amount.

Figure 15A:
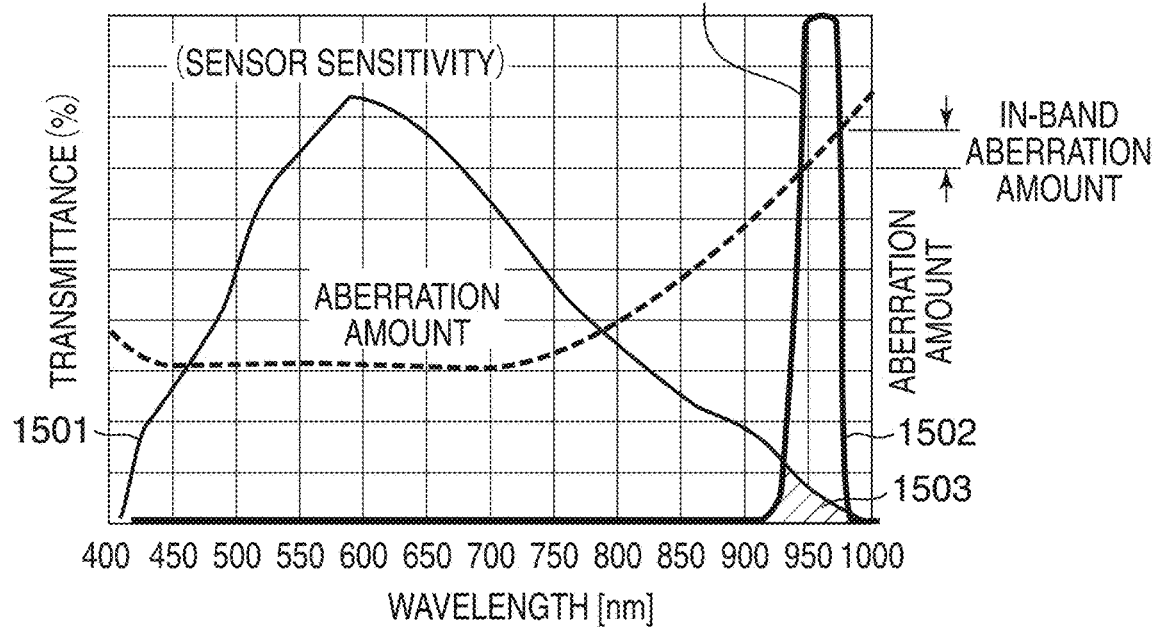
FIG. 15A is a graph showing a relation between a transmission characteristic of a first ultranarrow-band infrared pass filter, a light amount taken by the image pickup device, and an aberration amount occurred in cases where the first ultranarrow-band infrared pass filter is inserted in the filter unit in FIG. 11 and where the focal length of the surveillance camera is long.
Figure 15B:
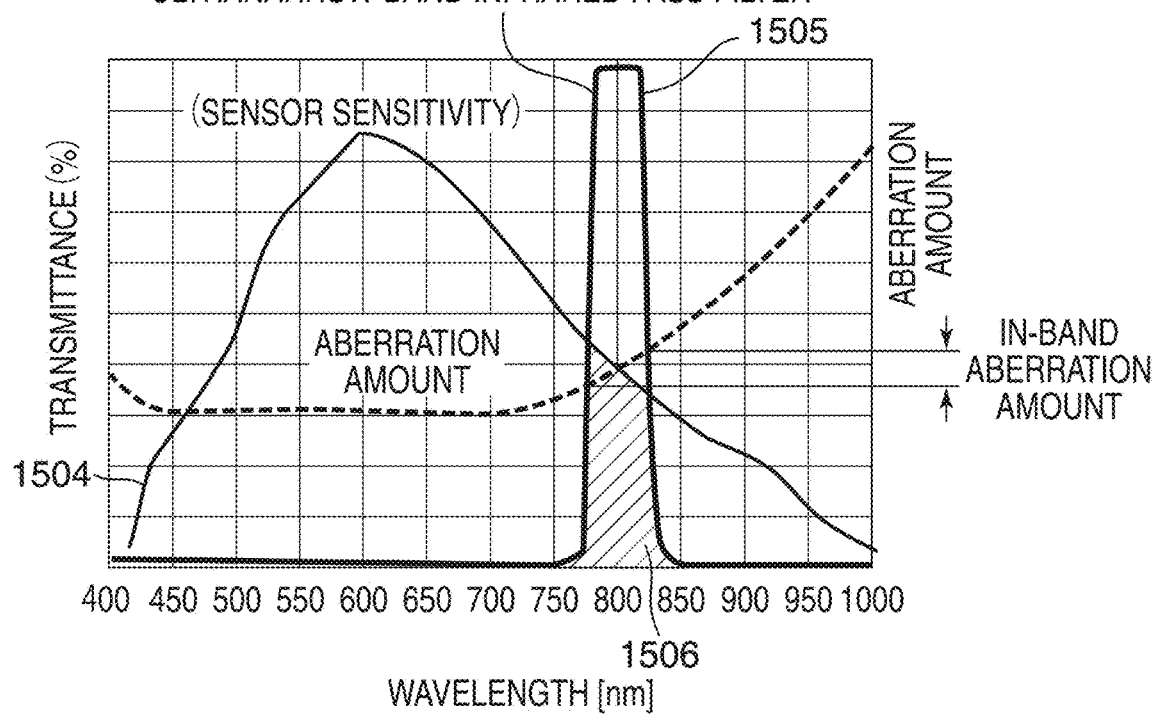
FIG. 15B is a graph showing the same relation as FIG. 15A using a second ultranarrow-band infrared pass filter of which a transmission band is different from that of the first ultranarrow-band infrared pass filter.

FIG. 15A is a graph showing a relation between a transmission characteristic of a first ultranarrow-band infrared pass filter 1103, a light amount taken by the image pickup device 103, and an aberration amount occurred in cases where the first ultranarrow-band infrared pass filter is inserted in the filter unit 102 in FIG. 11 and where the focal length of the surveillance camera 100 is long. FIG. 15B is a graph showing the same relation as FIG. 15A using a second ultranarrow-band infrared pass filter 1103 of which a transmission band is different from that of the first ultranarrow-band infrared pass filter. Since the aberration amount in the long focal length becomes larger than that in the middle focal length, the in-band aberration amount would not be kept within the tolerance even if the narrow-band infrared pass filter 1102 is used.

When the focal length is long, it is preferable to use an ultranarrow-band infrared pass filter 1103 of which a transmitted wavelength band is narrower than that of the narrow-band infrared pass filter 1102. An upper limit wavelength and a lower limit wavelength are determined so that the in-band aberration amount at the time of using the ultranarrow-band infrared pass filter 1103 is kept within the tolerance. For example, the ultranarrow-band infrared pass filter 1103 of which transmission characteristics is indicated by a transmission curve 1502 shown in FIG. 15A permits transmission of the light flux in a wavelength band from 920 nm to 1000 nm in the infrared range. The narrow-band infrared pass filter 1103 of which transmission characteristics is indicated by a transmission curve 1505 shown in FIG. 15B permits transmission of the light flux in a wavelength band from 760 nm to 840 nm in the infrared range.

An area of a region 1506 (a shadow region in FIG. 15B) surrounded by the sensitivity curve 1504 and the transmission curve 1505 in FIG. 15B is larger than an area of a region 1503 (a shadow region in FIG. 15A) surrounded by the sensitivity curve 1501 and the transmission curve 1502 in FIG. 15A. Accordingly, the image obtained by the transmitted light flux of the wavelength band from 760 nm to 840 nm is brighter than the image obtained by the transmitted light flux of the wavelength band from 920 nm to 1000 nm.

Since the sharpness of the object in the image obtained by the transmitted light flux of the wavelength band from 760 nm to 840 nm is lower than the sharpness of the object in the image obtained by the transmitted light flux of the wavelength band from 920 nm to 1000 nm. However, since light within the visible light range is hardly transmitted in both the cases, the difference between the sharpnesses is small, and the difference does not affect the quality of the image so much.

On the other hand, the in-band aberration amount of the image obtained by the transmitted light flux of the wavelength band from 760 nm to 840 nm is smaller than the in-band aberration amount of the image obtained by the transmitted light flux of the wavelength band from 920 nm to 1000 nm. Accordingly, the image obtained by the transmitted light flux of the wavelength band from 760 nm to 840 nm is less in the deterioration of the quality according to the aberration. Accordingly, when the focal length of the surveillance camera 100 is long, it is preferable to use the ultranarrow-band infrared pass filter 1103 that permits transmission of the light flux of the wavelength band from 760 nm to 840 nm by comprehensively considering the brightness of the image, the sharpness, and the in-band aberration amount.

Figure 16:
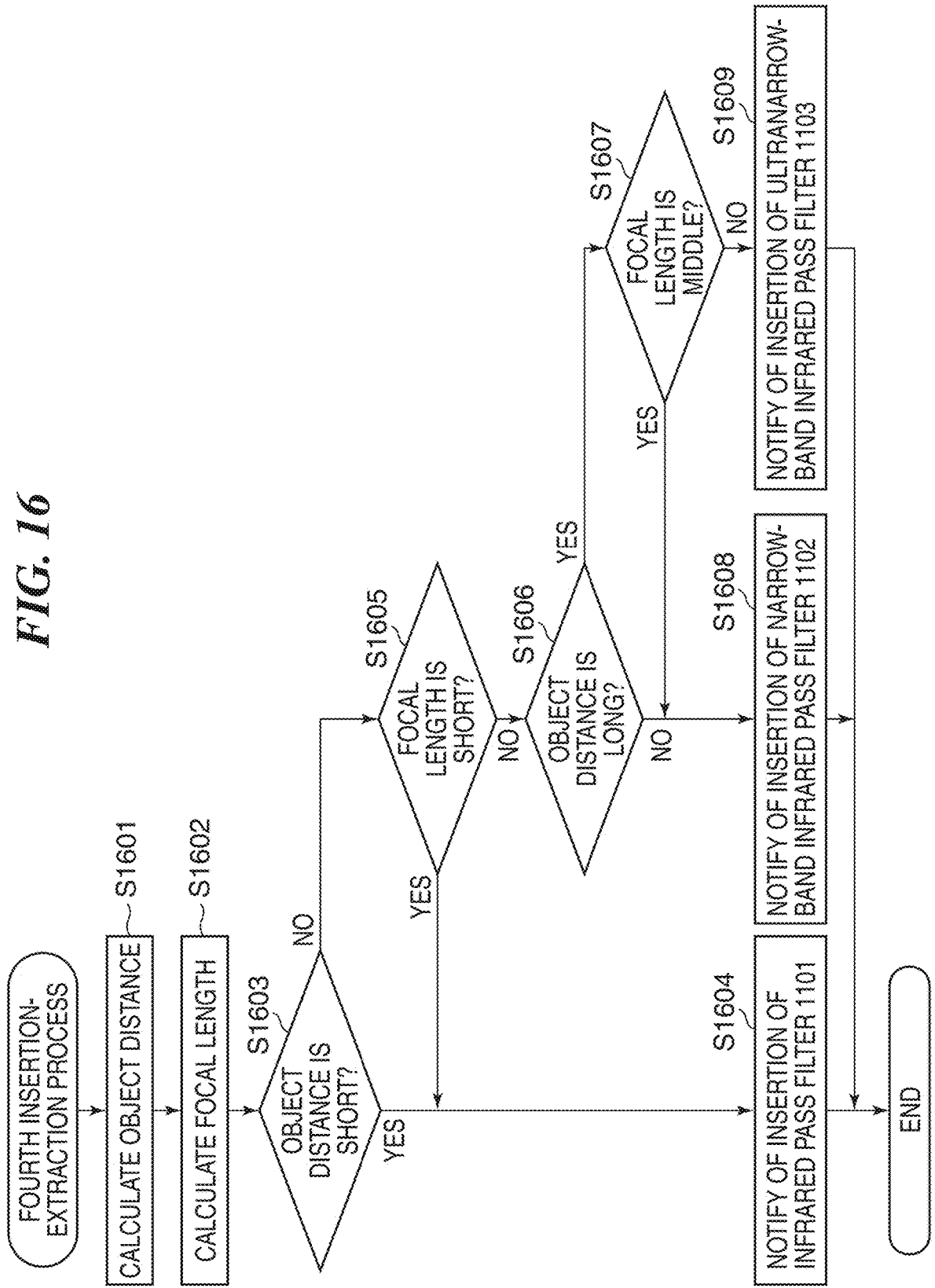
FIG. 16 is a flowchart showing procedures of a fourth insertion-extraction process executed by an insertion-extraction determination unit in FIG. 11.

FIG. 16 is a flowchart showing procedures of a fourth insertion-extraction process executed by the insertion-extraction determination unit 110 in FIG. 11. Moreover, FIG. 17 is a view showing a relation between a type of filter inserted in the filter unit 102 by performing the fourth insertion-extraction process in FIG. 16, an object distance, and a focal length. In the fourth insertion-extraction process, as shown in FIG. 17, the object distance is classified into three ranges including a short distance range, middle distance range, and long distance range. The focal length is classified into three ranges including a short range, middle range, and long range. A filter to be used is determined according to a combination of a range of the object distance and a range of the focal length.

As shown in FIG. 16, the object distance is calculated on the basis of the positions of the zoom lens 101a and the focusing lens 101b that the focus/zoom actuator 109 is notified (step S1601), the focal length is calculated on the basis of the field angle, for example (step S1602). Next, it is determined whether the object distance is short (step S1603). When the object distance is short, there is a low possibility that the light of the light flux is disturbed even if fog occurs between the surveillance camera 100 and the object.

Accordingly, even if the wavelength band in the infrared light becomes wide in order to keep the light amount, there is a low possibility that the object image blurs. Moreover, it is less subject to the aberration when the object distance is short. Accordingly, as a result of the determination in the step S1603, when the object distance is short, the insertion-extraction drive unit 111 is notified that the infrared pass filter 1101 is inserted in the filter unit 102 (step S1604), and this process is finished.

On the other hand, as a result of the determination in the step S1603, when the object distance is not short, it is determined whether the focal length is short (step S1605). As a result of the determination in the step S1605, when the focal length is short, the process proceeds to the step S1604. On the other hand, when the focal length is not short, it is determined whether the object distance is long (step S1606).

When the object distance is long, there is a high possibility that the visible light is disturbed when fog occurs between the surveillance camera 100 and the object. That is, it is needed to pick up an image of the object using the infrared light that is highly rectilinear selectively. Accordingly, it is necessary to insert the narrow-band infrared pass filter 1102 or the ultranarrow-band infrared pass filter 1103 in order to use infrared light more selectively.

Moreover, change of the aberration amount to change of the wavelength becomes large with increasing focal length, as shown in FIG. 12. Accordingly, when the wavelength band is determined so that the difference between the aberration amounts at the upper limit and the lower limit of the wavelength band of the transmitting infrared light is kept within the allowable aberration amount, it is necessary to narrow the wavelength band of the transmitting infrared light as the focal length becomes longer. That is, when the focal length is middle, the narrow-band infrared pass filter 1102 of which the wavelength band of the transmitting infrared light is not so narrow is used while giving priority to securement of the light amount. Moreover, when the focal length is long, the ultranarrow-band infrared pass filter 1103 of which the wavelength band of the transmitting infrared light is narrower is used while giving priority to settlement of the difference between the aberration amounts within the allowable aberration amount.

As mentioned above, as a result of the determination in the step S1606, when the object distance is not long, the insertion-extraction drive unit 111 is notified to insert the narrow-band infrared pass filter 1102 in the filter unit 102 (step S1608) to give priority to securement of the light amount because there is a low possibility that light is disturbed by fog etc., and this process is finished.

Moreover, even when it is determined that the object distance is long in the step S1606, when it is determined that the focal length is middle in the step S1607, the insertion-extraction drive unit 111 is notified to insert the narrow-band infrared pass filter 1102 in the filter unit 102 (step S1608) to give priority to securement of the light amount, and this process is finished.

On the other hand, as a result of the determination in the step S1607, when the focal length is long, the insertion-extraction drive unit 111 is notified to insert the ultranarrow-band infrared pass filter 1103 in the filter unit 102 (step S1609) to give priority to settlement of the difference between aberration amounts within the allowable aberration amount, and this process is finished.

According to the process in FIG. 16, the infrared pass filter 1101, the narrow-band infrared pass filter 1102, or the ultranarrow-band infrared pass filter 1103 is inserted in the filter unit 102 according to the object distance and focal length that are calculated. Accordingly, since priority is given to securement of the light amount or settlement of the difference between the aberration amounts within the allowable aberration amount depending on a situation, the deterioration of quality of the image obtained is prevented.

The aberration amount is controlled below the allowable aberration amount by inserting the infrared pass filter 1101, the narrow-band infrared pass filter 1102, or the ultranarrow-band infrared pass filter 1103 in the filter unit 102 according to the process in FIG. 16. Accordingly, the generated aberration amount of the object image is reduced below the allowable aberration amount irrespective of the focal length.

Since the difference between the aberration amounts at the upper limit and the lower limit of the wavelength band of the transmitting infrared light becomes smaller as the focal length becomes shorter irrespective of the object distance as shown in FIG. 12, the wavelength band of the transmitting infrared light may be wide when the focal length is short. Accordingly, the infrared pass filter 1101 is inserted. When the infrared pass filter 1101 is used, the surveillance camera 100 takes a more light amount at a time of picking up an image of an object as compared with the case where the narrow-band infrared pass filter 1102 or the ultranarrow-band infrared pass filter 1103 is used. Moreover, since there is a high possibility that the visibility of an object image is securable even if fog exist between the object and the surveillance camera 100 when the object distance is short, the infrared pass filter 1101 of which the wavelength band of the transmitting infrared light is wide is inserted while giving priority to securement of the light amount.

Furthermore, the difference between the aberration amounts of an object image at the upper limit and the lower limit of the wavelength band of the transmitting infrared light increases or influence of fog between an object and the surveillance cameras 100 becomes large as the object distance or the focal length increases. As a result, the visibility of the object image may not be securable. In this case, the narrow-band infrared pass filter 1102 or the ultranarrow-band infrared pass filter 1103 of which the wavelength band of the transmitting infrared light is narrow is used. Accordingly, the generating aberration amount is controlled below to the allowable aberration amount, and influence of fog is removed at a time of picking up an image of an object by using the infrared light that is highly rectilinear selectively.

It should be noted that the present invention is not limited to what has been described in the above-mentioned embodiment, quality of the material, shape, size, formation, the number of elements, arrangement locations, etc., can be changed suitably unless it is deviated from the scope of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-118348, filed Jun. 11, 2015, which is hereby incorporated by reference herein in its entirety.

What is claimed is:

1. An image pickup apparatus comprising:
    an insertion-extraction unit configured to insert and extract an optical filter which, when inserted, causes more infrared light to be transmitted than visible light;
    a computation unit configured to compute an object distance between the image pickup apparatus and an object;
    an evaluation unit configured to evaluate an image quality based on at least a sharpness in an image including a picked up object image;
    a control unit configured to control said insertion-extraction unit so as to insert or extract the optical filter based on the image quality and the object distance, to thereby secure visibility of the object; and
    a determination unit configured to determine whether the object distance is equal to or more than a predetermined distance,
    wherein the control unit configured to control said insertion-extraction unit to extract the optical filter in response to the determination unit determining that the object distance is less than the predetermined distance.

2. The image pickup apparatus according to claim 1,
    wherein said evaluation unit evaluates the image quality when the object distance is equal to or more than the predetermined distance, and
    wherein said control unit controls said insertion-extraction unit so as to insert the optical filter when the evaluated image quality is less than a predetermined threshold and to extract the optical filter when the evaluated image quality is equal to or more than the predetermined threshold or when the object distance is less than the predetermined distance.

3. The image pickup apparatus according to claim 1, wherein said evaluation unit evaluates the image quality based on a sharpness and a luminance dispersion value.

4. The image pickup apparatus according to claim 2, wherein the predetermined distance is infinity.

5. The image pickup apparatus according to claim 4, wherein said determination unit determines whether the object distance is infinity according to a field angle at a time of picking up an image of the object.

6. The image pickup apparatus according to claim 3, wherein the sharpness is calculated based on a luminance difference at an edge of an object image.

7. The image pickup apparatus according to claim 6, wherein the sharpness is calculated based on an image obtained by applying a filtering process at a predetermined frequency to the object image.

8. The image pickup apparatus according to claim 1, further comprising a division unit configured to divide the image into a plurality of areas,
    wherein the sharpness is calculated for every divided area.

9. The image pickup apparatus according to claim 8, wherein said control unit compares the sharpness calculated for every divided area with the predetermined threshold, counts the number of divided areas of which the sharpness is less than the predetermined threshold, and controls said insertion-extraction unit so as to insert the optical filter when the counted number is more than a predetermined number.

10. The image pickup apparatus according to claim 3, wherein the luminance dispersion value is calculated based on luminance distribution of the image including the picked-up object image.

11. The image pickup apparatus according to claim 2, further comprising a change unit configured to change the predetermined threshold based on one of a field angle and the object distance at a time of picking up the image of the object.

12. The image pickup apparatus according to claim 1, further comprising:
    an obtaining unit configured to obtain a gain value set up when brightness of the image is adjusted, and a gain value determination unit configured to determine whether the obtained gain value is equal to or more than a predetermined gain threshold, wherein said control unit controls said insertion-extraction unit so as to extract the optical filter when the obtained gain value is equal to or more than the predetermined gain threshold.

13. An image pickup apparatus comprising:
an insertion-extraction unit configured to insert and extract an optical filter which, when inserted, causes more infrared light to be transmitted than visible light;
an obtaining unit configured to obtain a gain value set up when brightness of an image including a picked-up object image is adjusted;
a gain value determination unit configured to determine whether the obtained gain value is equal to or more than a predetermined gain threshold; and
a control unit configured to control said insertion-extraction unit so as to extract the optical filter when the obtained gain value is equal to or more than the predetermined threshold and to insert the optical filter when the obtained gain value is less than the predetermined threshold, to thereby secure visibility of the picked-up object image.

14. The image pickup apparatus according to claim 13, further comprising an execution unit configured to apply an image process to an image picked up when the optical filter is extracted or to an image picked up when the optical filter is inserted,
wherein a processing level of the image process applied to the image picked up when the optical filter is extracted is stronger than the processing level of the image process applied to the image picked up when the optical filter is inserted.

15. The image pickup apparatus according to claim 13, wherein the image process is a gamma process that corrects a luminance level and a color difference level of an output image based on a luminance level and a color difference level of an input image, a sharpness process that emphasizes an edge of an object image included in the image, or a noise reduction process that reduces noise included in the image.

16. An image pickup apparatus comprising:
an insertion-extraction unit configured to insert or extract a first optical filter which, when inserted, causes more infrared light to be transmitted than visible light, a second optical filter which, when inserted, causes more infrared light to be transmitted than visible light and which a wavelength band of transmitting infrared light is narrower than that of the first optical filter, or a third optical filter which, when inserted, causes more infrared light to be transmitted than visible light and which a wavelength band of transmitting infrared light is narrower than that of the second optical filter;
a computation unit configured to compute an object distance between the image pickup apparatus and an object;
an obtaining unit configured to obtain a focal length of the image pickup apparatus; and
a control unit configured to control said insertion-extraction unit so as to insert the first optical filter, the second optical filter, or the third optical filter according to the computed object distance and the obtained focal length, to thereby secure visibility of the object.

17. The image pickup apparatus according to claim 16, wherein an aberration amount occurs in the focal length when the first optical filter, the second optical filter, or the third optical filter is inserted is below a predetermined aberration amount.

18. The image pickup apparatus according to claim 16, wherein the second optical filter and the third optical filter permit transmission of light of a wavelength range in which sensitivity of an image pickup device included in the image pickup apparatus is high.

19. The image pickup apparatus according to claim 1, wherein the object distance is a distance between the image pickup apparatus and an object to be photographed.

20. The image pickup apparatus according to claim 1, wherein the image pickup apparatus further comprises an image sensor and the optical filter is configured to be inserted on an image-side of the image sensor.

21. The image pickup apparatus according to claim 13, wherein the image pickup apparatus further comprises an image sensor and the optical filter is configured to be inserted on an image-side of the image sensor.

22. The image pickup apparatus according to claim 16, wherein the image pickup apparatus further comprises an image sensor and the optical filter is configured to be inserted on an image-side of the image sensor.

23. The image pickup apparatus according to claim 1, wherein the image quality is calculated based on the sharpness and a luminance dispersion value obtained from a generated luminance histogram of the image.

* * * * *